(12) United States Patent
Renshaw et al.

(10) Patent No.: US 11,906,785 B2
(45) Date of Patent: Feb. 20, 2024

(54) PHOTONIC INTEGRATED CIRCUIT OUTCOUPLING ARRAY FOR IMAGING-BASED BEAM STEERING

(71) Applicant: University of Central Florida Research Foundation, Inc., Orlando, FL (US)

(72) Inventors: Christopher Renshaw, Orlando, FL (US); Sajad Saghaye Polkoo, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 16/918,792

(22) Filed: Jul. 1, 2020

(65) Prior Publication Data
US 2021/0003784 A1    Jan. 7, 2021

Related U.S. Application Data

(60) Provisional application No. 62/869,313, filed on Jul. 1, 2019.

(51) Int. Cl.
*G02B 6/35*    (2006.01)
*G02B 6/293*    (2006.01)

(52) U.S. Cl.
CPC ......... *G02B 6/3596* (2013.01); *G02B 6/2938* (2013.01); *G02B 6/3586* (2013.01)

(58) Field of Classification Search
CPC .............................. G02B 6/354; G02B 6/3523
See application file for complete search history.

(56) References Cited

U.S. PATENT DOCUMENTS

| | | | |
|---|---|---|---|
| 6,411,752 B1 * | 6/2002 | Little | G02B 6/126 385/24 |
| 8,988,754 B2 * | 3/2015 | Sun | G02B 6/12033 359/238 |

(Continued)

OTHER PUBLICATIONS

Abediasl, Hooman et al., "Monolithic optical phased-array transceiver in a standard SOI CMOS process", Optics Express, vol. 23, No. 25, Published Mar. 2, 2015, DOI: 10.1364/OE.23.006509, 11 pages.

(Continued)

*Primary Examiner* — Eric Wong
(74) *Attorney, Agent, or Firm* — Suiter Swantz pc llo

(57) ABSTRACT

A coupler array device may include an array of couplers arranged in a coupler plane, where each of the couplers couples light between the coupler plane and one or more directions outside of the coupler plane. A coupler array device may further include a pixel switch network to selectively couple light into or out of a selected subset of the plurality of couplers, where the pixel switch network may include one or more pixel-network waveguides and pixel-network switches to couple light between couplers and pixel-network waveguides. The coupler array device may further include one or more feed networks including a feed-line waveguide and one or more feed-network switches to couple light between the feed-line waveguide and at least some of the pixel-network waveguides. Light may be routable between selected couplers and selected feed-line waveguides along selected paths by controlling the pixel-network switches and the feed-network switches along the selected paths.

38 Claims, 20 Drawing Sheets

(56) References Cited

U.S. PATENT DOCUMENTS

| | | | |
|---|---|---|---|
| 11,236,993 B1* | 2/2022 | Hall | G01B 11/25 |
| 2016/0141754 A1* | 5/2016 | Leyh | H01Q 13/00 |
| | | | 342/372 |
| 2017/0104269 A1* | 4/2017 | Bowden | H01Q 1/36 |
| 2018/0175961 A1* | 6/2018 | Spector | H04Q 11/0005 |
| 2019/0391243 A1* | 12/2019 | Nicolaescu | G01S 17/42 |
| 2021/0116778 A1* | 4/2021 | Zhang | E06B 9/34 |
| 2022/0120983 A1* | 4/2022 | Leigh | G02B 6/29343 |

OTHER PUBLICATIONS

Geib, Kent M. et al., "Fabrication and performance of large (64x64) arrays of integrated VCSELs and detectors", Proceedings of SPIE, vol. 4649 (2002), Downloaded: https://www.spiedigitallibrary.org/conference-proceedings-of-spie on Apr. 26, 2021, 7 pages.

Gomez, Ariel et al., "Beyond 100-GB/s Indoor Wide Field-of-View Optical Wireless Communications", IEEE Photonics Technology Letters, vol. 27, No. 4, Feb. 15, 2015, 4 pages.

Hutchison, David N. et al., "High-resolution aliasing-free optical beam steering", Optica, vol. 3, No. 8, Aug. 2016, 4 pages.

Koonen, Ton et al., "High-Capacity Optical Wireless Communication Using Two-Dimensional IR Beam Steering", Journal of Lightwave Technology, vol. 36, No. 19, Oct. 1, 2018, 8 pages.

Oh, C. W. et al., "Steerable pencil beams for multi-Gbps indoor optical wireless communication", Optics Letters, vol. 30, No. 18, Sep. 15, 2014, 4 pages.

Sayyah, Keyvan et al., "Two-dimensional pseudo-random optical phased array based on tandem optical injection locking of vertical cavity surface emitting lasers", Optics Express, Published Jul. 17, 2015, vol. 23, No. 15, COI: 10.1364/OE.23.019405, 12 pages.

Short, Ralph C. et al., "Performance of a demonstration system for simultaneous laser beacon tracking and low-data-rate optical communications with multiple platforms", Proceedings of SPIE, vol. 1417 Free-Space Laser Communication Technologies III (1991), Downloaded from https://www.spiedigitallibrary.org/conference-proceedings-of-spie on Apr. 26, 2021, 13 pages.

Sun, Jie et al., "Large-scale nanophotonic phased array", Letter, Nature, vol. 493, Jan. 10, 2013, DOI: 10.1038/nature11727, 5 pages.

Toyoshima, Morio et al., "Non-mechanical Compact Optical Transceiver for Optical Wireless Communications", National Institute of Information and Communications Technology, Japan, Advanced Trends in Wireless Communications, www.intechopen.com, (2011), 14 pages.

Tu, Xin, et al., "State of the Art and Perspectives on Silicon Photonic Switches", Micromachines 10(1), 51 (2019), 19 pages.

Yuksel, Murat et al., "Free-space-optical mobile and hoc networks: Auto-configurable building blocks", Wireless Netw (2009) 15:295-312, DOI 10.1007/s11276-007-0040-y, 18 pges.

Zhang, Xuebing et al., "40 GB/s indoor optical wireless system enabled by a cyclically arranged optical beamsteering receiver", Optics Letters, vol. 43, No. 4, Feb. 15, 2018, 4 pages.

Parand, F. et al., "Cellular tracked optical wireless demonstration link", IEE Proc. Optoelectron., vol. 150, No. 5, Oct. 2003, 10 pages.

\* cited by examiner

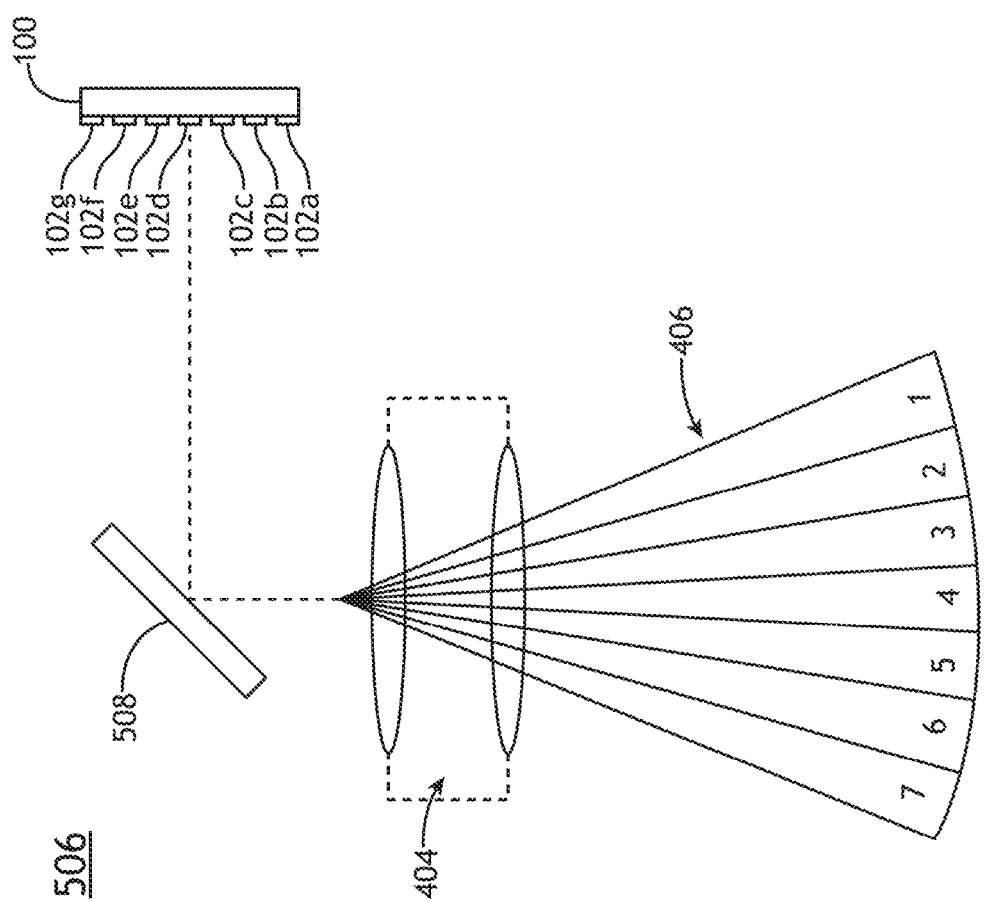

PHOTONIC INTEGRATED CIRCUIT OUTCOUPLING ARRAY FOR IMAGING-BASED BEAM STEERING

CROSS-REFERENCE TO RELATED APPLICATION

The present application claims the benefit under 35 U.S.C. § 119(e) of U.S. Provisional Application Ser. No. 62/869,313, filed Jul. 1, 2019, entitled PHOTONIC INTEGRATED CIRCUIT OUTCOUPLING ARRAY FOR IMAGING-BASED BEAM STEERING, naming Christopher Renshaw and Sajad Saghaye Polkoo as inventors, which is incorporated herein by reference in the entirety.

TECHNICAL FIELD

The present disclosure relates generally to imaging-based beam steering and, more particularly, to routing optical signals to an output array with photonic integrated circuitry.

BACKGROUND

Light-emitting arrays providing independently-controllable light sources are useful for a wide variety of applications including, but not limited to, imaging-based beam steering (IBBS) systems. IBBS typically utilizes a passive imaging optic and a light-emitting array at the focal plane to map light from spatial coordinates of the light-emitting array to dedicated angular directions (e.g., steering angles). In this regard, IBBS essentially converts angular line of sight (LOS) control into a 2D position control problem, which enables precise electronically-controlled beam steering in compact, lightweight, power-efficient systems.

IBBS beam-steering provides significant advantages over conventional beam-steering solutions including, but not limited to, moving mirrors, Risley prisms, phased arrays, or adaptive optics. IBBS beam-steering is further suitable for a variety of applications, such as free-space optical communications, optical range imaging (e.g., LIDAR) and other structured illumination technologies. Most notably, IBBS uniquely allows simultaneous control of multiple lines of sight allowing independent and simultaneous (i.e., multiplexed) addressing into the field of regard (FOR). For example, multiplexed addressing may enable multiplexed communication to numerous devices from a single aperture in a free-space optical communications system. By way of another example, multiplexed addressing may enable multiplexed ranging for LIDAR imaging to improve frame rates while maintaining eye-safe emissions from the aperture. However, utilizing the full potential of IBBS requires novel, high-density emitter arrays capable of independent high-bandwidth emission from individual pixels as well as high-speed electronic control. There is therefore a need to develop systems and methods that cure at least some of the deficiencies above.

SUMMARY

A coupler array device is disclosed in accordance with one or more illustrative embodiments of the present disclosure. In one illustrative embodiment, the coupler device includes couplers arranged in a coupler plane, where each coupler may couple light between the coupler plane and one or more directions outside of the coupler plane. In another illustrative embodiment, the coupler device includes a pixel switch network to selectively couple light into or out of a selected subset of the couplers. In another illustrative embodiment, the pixel switch network includes one or more pixel-network waveguides and one or more pixel-network switches, where each of the pixel-network switches may selectively couple light between one of the couplers and one of the pixel-network waveguides. In another illustrative embodiment, the coupler array device includes one or more feed networks. In another illustrative embodiment, each feed network includes a feed-line waveguide and one or more feed-network switches to selectively couple light between the feed-line waveguide and at least some of the pixel-network waveguides. In another illustrative embodiment, light is routable between selected couplers of the plurality of couplers and selected feed-line waveguides of the one or more feed networks along selected paths by controlling the pixel-network switches and the feed-network switches along the selected paths.

An imaging-based beam steering system is disclosed in accordance with one or more illustrative embodiments of the present disclosure. In one illustrative embodiment, the system includes one or more input light sources. In another illustrative embodiment, the system includes a photonic integrated circuit (PIC) coupler array. In another illustrative embodiment, the PIC coupler array includes couplers arranged in a coupler plane, where each of the couplers may couple light between the coupler plane and one or more directions outside of the coupler plane. In another illustrative embodiment, the PIC coupler array includes a pixel switch network to selectively couple light into or out of a selected subset of the couplers. In another illustrative embodiment, the pixel switch network includes one or more pixel-network waveguides and one or more pixel-network switches, where each of the pixel-network switches may to selectively couple light between one of the couplers and one of the pixel-network waveguides. In another illustrative embodiment, the PIC coupler array includes one or more feed networks. In another illustrative embodiment, each feed network includes a feed-line waveguide and one or more feed-network switches to selectively couple light between the feed-line waveguide and at least some of the pixel-network waveguides. In another illustrative embodiment, light is routable between selected couplers of the plurality of couplers and selected feed-line waveguides of the one or more feed networks along selected paths by controlling the pixel-network switches and the feed-network switches along the selected paths. In another illustrative embodiment, the system includes a source switch network including one or more source switches to selectively route light from one or more input light sources to the one or more feed networks. In another illustrative embodiment, the system includes a controller coupled to the pixel-switch network and the source-switch network. In another illustrative embodiment, the controller receives one or more address states, where each of the one or more address states includes a selected input light source from the one or more input light sources and a selected coupler. In another illustrative embodiment, the controller selects a path for each of the one or more address states. In another illustrative embodiment, the controller controls, with one or more drive signals, the pixel-network switches, the feed-network switches, and the source switches along the paths for each of the one or more address states to direct light along the paths for each of the one or more address states. In another illustrative embodiment, the system includes a lens positioned with the PIC coupler array at a focal plane, where the lens collects the light from the PIC coupler array and the light from the selected coupler emerges from the lens at one or more selected output angles based on a location of the selected coupler for each of the one or more address states.

An imaging-based beam receiving system is disclosed in accordance with one or more illustrative embodiments of the present disclosure. In another illustrative embodiment, the system includes a photonic integrated circuit (PIC) coupler array. In another illustrative embodiment, the PIC coupler array includes couplers arranged in a coupler plane, where each of the couplers may couple light between the coupler plane and one or more directions outside of the coupler plane. In another illustrative embodiment, the PIC coupler array includes a pixel switch network to selectively couple light into or out of a selected subset of the couplers. In another illustrative embodiment, the pixel switch network includes one or more pixel-network waveguides and one or more pixel-network switches, where each of the pixel-network switches may to selectively couple light between one of the couplers and one of the pixel-network waveguides. In another illustrative embodiment, the PIC coupler array includes one or more feed networks. In another illustrative embodiment, each feed network includes a feed-line waveguide and one or more feed-network switches to selectively couple light between the feed-line waveguide and at least some of the pixel-network waveguides. In another illustrative embodiment, light is routable between selected couplers of the plurality of couplers and selected feed-line waveguides of the one or more feed networks along selected paths by controlling the pixel-network switches and the feed-network switches along the selected paths. In another illustrative embodiment, the system includes a lens positioned with the PIC coupler array at a focal plane, where the lens is configured to direct light to the light from the PIC coupler array and where the lens maps light from selected input angles incident on the lens to selected locations of the PIC coupler array. In another illustrative embodiment, the system includes one or more light detectors. In another illustrative embodiment, the system includes a receiver switch network including one or more receiver switches configured to selectively route light from the one or more feed networks to one or more light detectors. In another illustrative embodiment, the system includes a controller coupled to the pixel-switch network and the source-switch network. In another illustrative embodiment, the controller receives one or more address states, where each of the one or more address states includes a selected light detector and a selected coupler. In another illustrative embodiment, the controller selects a path for each of the one or more address states. In another illustrative embodiment, the controller controls, with one or more drive signals, the pixel-network switches, the feed-network switches, and the receiver switches along the paths for each of the one or more address states to direct light along the paths for each of the one or more address states for detection by the one or more light detectors.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 5B is a conceptual diagram of a hybrid IBBS system including an adjustable mirror located between the lens and a PIC coupler array, in accordance with one or more embodiments of the present disclosure.

DETAILED DESCRIPTION

Figure 1:
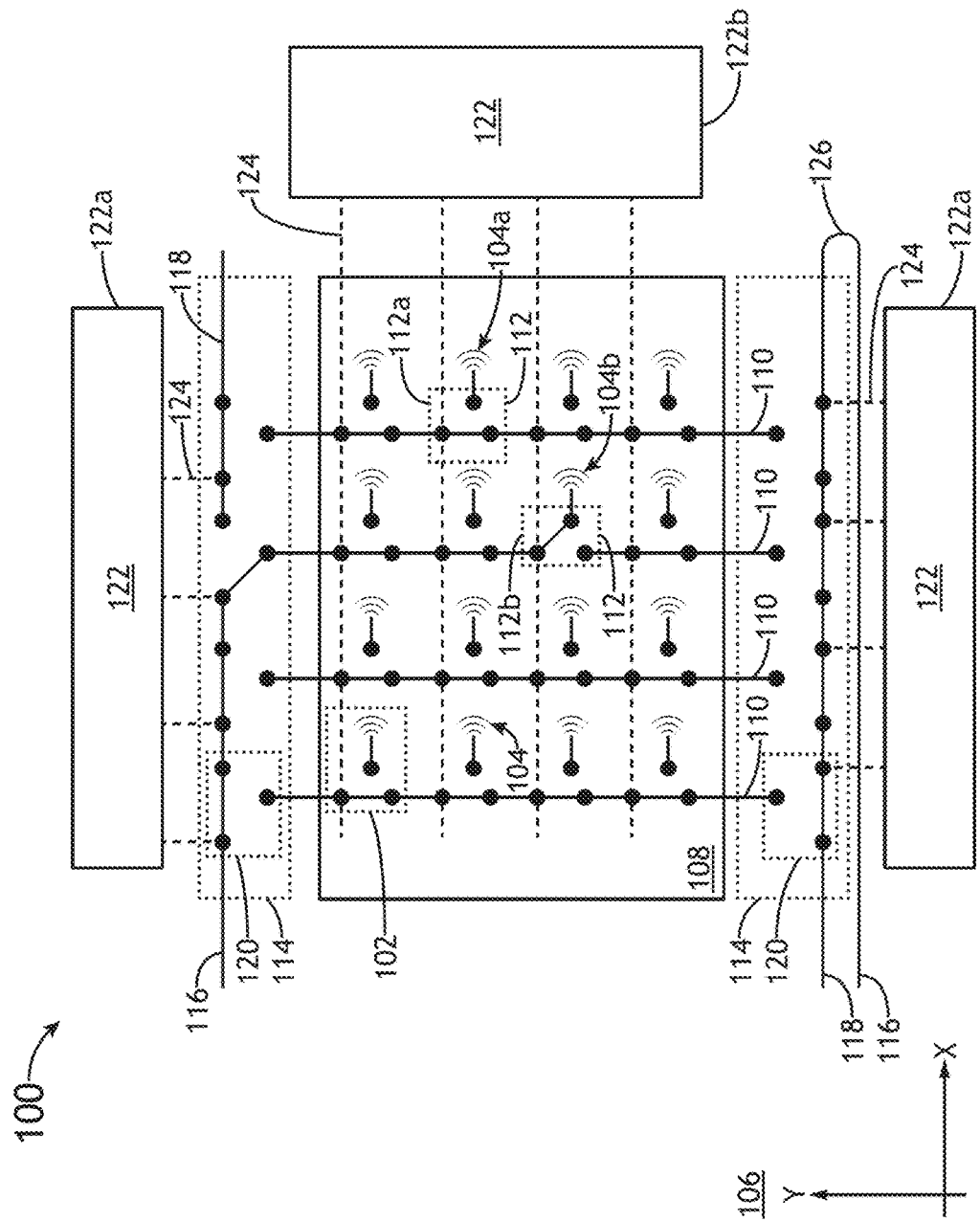
FIG. 1 is a schematic view of a PIC coupler array in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a photonic integrated circuit coupler array (e.g., a PIC coupler array) suitable for selectively routing optical signals into and out of a coupler plane. The PIC coupler array may thus operate as a high-density input coupler, output coupler, or multi-directional coupler for a variety of applications including, but not limited to imaging-based beam steering (IBBS). Additional embodiments of the present disclosure are directed to selectively routing optical signals to or from pixels in a PIC coupler array.

In some embodiments, a PIC coupler array includes an array of pixels (e.g., a pixel array) distributed across a surface (e.g., a coupler plane), where a particular pixel in the PIC coupler array may include a coupler to direct, route, or steer light between a direction along the coupler plane and a direction outside the coupler plane (e.g., a direction at least partially normal to the coupler plane). A pixel in the PIC coupler array may further include an optical switch (e.g., a pixel-network switch) to selectively direct light to or from the coupler. A PIC coupler array may further include any number of pixel-network waveguides in the coupler plane coupled to the pixel switches. In this regard, the pixel-network waveguides may provide paths for light to propagate between the couplers of the PIC coupler array and external components. Further, light may be selectively routed between a coupler in a selected pixel and an adjacent pixel-network waveguide by selectively controlling the corresponding pixel switch.

A PIC coupler array may further include any number of feed networks including a feed-line waveguide and optical switches (e.g., feed-network switches) to selectively route light between a feed-line waveguide and one or more pixel-network waveguides. In this regard, light may be coupled into or out of the couplers through multiple paths.

The PIC coupler array may be formed from various optical components depending on selected performance or fabrication requirements. For example, a coupler within a pixel may include any type of optical device suitable for directing light in and out of the coupler plane such as, but not limited to, a grating or a reflective surface. Further, a pixel switch within a pixel may include any type of optical switch known in the art such as, but not limited to, an electro-optical switch or a mechanical switch (e.g., a micro-electro-mechanical-system (MEMS)).

The PIC coupler array may be suitable for any combination of emission and collection of light. For example, one or more light sources may be connected to the feed waveguides such that light from the one or more light sources may be routed to one or more selected pixels in the PIC coupler array for emission. By way of another example, one or more detectors may be connected to the feed waveguides such that incident light received by couplers in the PIC coupler array may be routed to selected detectors for detection. In this regard, the couplers may operate as outcouplers and/or incouplers. Further, the PIC coupler array may be suitable for bi-directional operation for simultaneous emission and collection of light.

The PIC coupler array as disclosed herein may provide the capability to selectively couple light into or out of the coupler plane (e.g., a plane including the PIC coupler array) at different locations in the coupler plane corresponding to different locations of the couplers in the PIC coupler array. In particular, light may be coupled into or out of the coupler plane at multiple couplers either simultaneously or sequentially. However, it is noted that although multiple couplers of the PIC coupler array may be utilized simultaneously, the all couplers may not be used simultaneously. For example, the PIC coupler array does not include a separate path for each coupler. Rather, the PIC coupler array includes a series of optical switch networks (e.g., a pixel-switch network, one or more feed networks, a source switch network, a receiver switch network, a selection switch network, or the like) that provide dynamic selection of optical paths to the couplers. Further, in some embodiments, a number of feed-line waveguides (or feed networks) is smaller than a number of couplers (or pixels) in the PIC coupler array, which may limit the number of couplers that may be in use at one time. In this regard, a PIC coupler array is differentiated from other optical pixel-array technologies such as, but not limited to, displays and optical phased arrays.

Additional embodiments of the present disclosure are directed to switch networks including optical switches and/or waveguides for selectively routing light into and/or out of the PIC coupler array. Further, switch networks may provide coupling to any combination of source or detection devices. A PIC coupler array (or a device including a PIC coupler array) may include additional switch networks (e.g., networks of optical switches) to route selectively route light to or from selected feed-line waveguides associated with feed networks. For example, a source switch network may route input signals from one or more input light sources to selected feed-line waveguides of selected feed networks for outcoupling from selected couplers. In particular, the source switch network may enable various operational modes. For instance, a single input light source may be directed to any selected pixel. In another instance, two or more input light sources may be simultaneously or sequentially directed to one or more selected pixels. By way of another example, a receiver switch network may route light from feed-line waveguides (e.g., incoupled light from selected couplers) to one or more light detectors for detection. By way of a further example, a selection switch network may facilitate bi-directional operation. In some embodiments associated with bi-directional operation, a switch network may enable control of both light from light sources for emission and incident light for detection by the PIC coupler array through directional or time-controlled switching.

Optical switches (e.g., the pixel switches, switches in a source/receiver switch network, or the like) may exhibit losses such that a path loss between an external device and a coupler in the PIC coupler array may generally increase with the number of switches along the path. It may therefore be desirable to limit or otherwise manage the number of switches along a selected path. Accordingly, the PIC coupler array may support any number or combination of waveguides to the pixels. In some embodiments, a particular pixel-network waveguide may couple only to a subset of pixels (e.g., a column of pixels in the above example, a portion of a column of pixels, a single pixel, or the like). In some embodiments, multiple feed networks may be arranged to provide multiple pathways to a pixel or group of pixels. Such a configuration may be suitable for, but is not limited to, multiplex applications to facilitate simultaneous addressing of multiple pixels.

Systems and methods disclosed herein may be scalable to provide PIC coupler arrays with any number of pixels. In this regard, PIC coupler arrays disclosed herein may facilitate high pixel counts. For example, PIC coupler arrays may have, but are not limited to, dimensions of 128×128 pixels.

Additional embodiments of the present disclosure are directed to systems incorporating a PIC coupler array as described herein. For example, some embodiments of the present disclosure are directed to an image-based beam steering system (IBBS) incorporating a PIC coupler array. For example, an IBBS may include a PIC coupler array located at a focal plane of a passive imaging optic. In this regard, an angle of emission may be controlled by emitting light from a selected pixel in the PIC coupler array.

An IBBS incorporating a PIC coupler array may facilitate the use of any type of on-chip or off-chip input light sources for emission. Further, these input sources may be generated using existing wavelength division multiplexing (WDM) technologies to encode information onto a large number of independently-controllable wavelength channels and combine them into a single optical signal. Accordingly, this approach may provide higher bandwidth than other IBBS technologies such as those incorporating direct emitter arrays, which may be limited to the modulation rates of a single laser (e.g., nominally <30 GHz). Further, an IBBS incorporating a PIC coupler array may provide a higher bandwidth and more wavelength flexibility than an IBBS incorporating wavelength-selective switching.

Additional embodiments of the present disclosure are directed to a hybrid IBBS in which angular beam tuning may be accomplished using both a PIC coupler array and one or more mechanical components. In some embodiments, a hybrid IBBS includes a translation stage to translate at least one of the passive imaging optic or the PIC coupler array within the coupler plane (e.g., the focal plane of the imaging optic). In this regard, the PIC coupler array may provide course tuning and the translation stage may provide fine tuning. In some embodiments, a hybrid IBBS includes an adjustable mirror between the PIC coupler array and the imaging optic or after the imaging optic. In this regard, the PIC coupler array may provide course tuning and the adjustable mirror provides fine tuning by tilting the optical axis of the system.

It is contemplated herein that a PIC coupler array, as well as associated systems, may be fabricated using any fabrication technique known in the art including, but not limited to, complementary metal-oxide-semiconductor (CMOS) fabrication techniques. Further, the PIC coupler array, as well as associated systems, may be fabricated out of any materials suitable for operation at desired wavelengths. For example, some example designs described herein are suitable for telecom C-band wavelengths and are fabricated using the silicon-on-insulator (SOI) platform with features, devices, waveguides, etc., fabricated using the top silicon (i.e. "device") layer, which is a mature platform for integrated photonics. By way of another example, the PIC coupler array may be fabricated out of any optical materials including, but not limited to, chalcogenide materials, silica, silicon nitride, or lithium niobate. Further, the PIC coupler array may be suitable for wavelength range (e.g., visible, near-infrared, infrared, or the like) or spectral band (e.g., O, E, S or L telecom bands).

It is further contemplated herein that the beam steering design and capabilities enabled using PIC coupler array routing with IBBS mapping could also be utilized in LIDAR imaging or other active illumination applications. A benefit of this approach is non-mechanical beam-steering with multiple lines of sight to achieve large frame-rates and long ranges with eye-safe (out of the aperture) conditions. This approach may also achieve greater ranges within eye safety limits compared to flash LIDAR that flood illuminates the entire scene at once and uses no beam-steering. Further, the use of multiple beams not only allows for faster frame rates but may also allow continuous monitoring at high-speeds around regions of interest in a scene. Additionally, this approach may provide an integrated beam-steering solution superior to scanned systems.

Beam steering systems using PIC coupler arrays as described herein are further naturally multiplexed to provide parallel communications between, potentially, large numbers of remote devices that is well suited for a communications hub to end-point users or for mesh-networking that can increase communication range and robustness in RF congested environments. In some embodiments, beam steering using PIC coupler arrays may be used for indoor free-space optical communications to augment and/or replace radio-frequency (RF) wireless communications for added bandwidth or secure networking. For example, one device may be used as a hub on the ceiling in the center of the room to communicate to many (e.g., hundreds) of devices in the room. Transceivers based on this invention may also be incorporated into phones, computers or other devices that could communicate with the hub (or other devices directly) regardless of the orientation of the device. In some embodiments including defense applications, where secure communications in RF congested environments is critical, beam steering using PIC coupler arrays could be used to enable man-portable, vehicle or drone mounted free-space optical transceivers for communication between mobile devices or to a central hub or to establish a dynamic mesh network for communications.

Referring now to FIGS. 1 through 13, systems and methods for routing light to or from a PIC coupler array are described in greater detail.

FIG. 1 is a schematic view of a PIC coupler array 100 in accordance with one or more embodiments of the present disclosure. In one embodiment, the PIC coupler array 100 includes a plurality of pixels 102, where each pixel 102 includes a coupler 104 suitable for coupling light between a coupler plane 106 (here illustrated as the X-Y plane) and directions out of the coupler plane 106 (e.g., directions at least partially normal to the X-Y plane). In the context of the present disclosure, outcoupling is associated with coupling light from within the coupler plane 106 to a direction out of the coupler plane 106 and incoupling is associated with the reverse. It is to be understood that a particular implementation of a pixel 102 may be designed solely for outcoupling, solely for incoupling, or for multi-directional operation suitable for both outcoupling and incoupling.

Further, a coupler 104 may include any type of optical coupling element known in the art. In one embodiment, a coupler 104 is formed from a grating arranged to diffract light into or out of the coupler plane 106. For example, compact and broadband gratings may couple ~50% ($\eta_{oc}$=−3 dB) of an input signal within the coupler plane 106 into a diffraction order oriented nearly perpendicular to the coupler plane 106, which may yield nearly lossless coupling into a 53° acceptance cone of an F/1 IBBS lens. Similar results may be achieved in the reverse direction as well. By way of another example, a coupler formed from a sub-wavelength grating (SWG) may provide greater than 80% coupling efficiency with an approximately 90 nm coupling window. In another embodiment, a coupler 104 is formed as an angled reflective surface. For example, a coupler 104 may be formed from an angled facet in a waveguide coupled to a pixel-network switch 112.

In the case of a grating-based coupler 104, the incoupling efficiency may generally be dominated by the grating efficiency and focusing efficiency, which is related to the overlap of a focused spot with the grating in the focal plane. For example, large gratings that occupy a large fraction of the pixel may provide high incoupling efficiency, but may reduce the outcoupling efficiency. Further, large gratings may impact the pixel density. Accordingly, tradeoffs associated with grating size and pixel density may be evaluated in any particular application.

In another embodiment, the PIC coupler array 100 includes a pixel switch network 108 to dynamically control the path of light through the PIC coupler array 100 to selected pixels 102. For example, the pixel switch network 108 may include a plurality of pixel-network waveguides 110 and pixel-network switches 112 to route light to or from various pixels 102.

Further, the pixel-network switches 112 and the pixel-network waveguides 110 may be integrated into the PIC coupler array 100 in a variety of configurations. For example, a pixel 102 may include a coupler 104 and a pixel-network switch 112. In this regard, the pixel-network waveguides 110 may be distributed to the pixel-network switches 112 of the various pixels 102 in the PIC coupler array 100. By way of another example, a pixel 102 may only include a coupler 104. In this regard, the pixel-network switches 112 may be integrated into the pixel-network waveguides 110 and may be distributed to the couplers 104 throughout the PIC coupler array 100. Further, it is contemplated herein that the description of what is included within a pixel 102 may be merely purely conceptual or may be tied to the fabrication process. Out of convenience, a pixel 102 is generally described throughout the present disclosure as having a coupler 104 and a pixel-network switch 112, though it is to be understood that this is for illustrative purposes only and should not be interpreted as limiting.

In another embodiment, the PIC coupler array 100 includes one or more feed networks 114 to route signals to or from the pixel-network waveguides 110 and one or more one or more feed-line waveguides 116. A feed network 114 may include one or more feed-network waveguides 118 and one or more feed-network switches 120 to selectively route light from a feed-line waveguide 116 to a selected feed-network waveguide 118 for transmission to a selected pixel 102 for outcoupling or the reverse for incoupling.

Optical switches within the PIC coupler array 100 (e.g., the pixel-network switches 112 and the feed-network switches 120) may include any type of optical switches known in the art. Further, the PIC coupler array 100 may include, but is not required to include, multiple types of optical switches. For example, it may be advantageous to provide relatively small pixel-network switches 112 to provide a high density of pixels 102 in the PIC coupler array 100. However, the constraints on the size of the feed-network switches 120 may be less stringent. In this regard, the pixel-network switches 112 and the feed-network switches 120 may be, but are not required to be, formed using different optical switch architectures. Similarly, the optical waveguides throughout the PIC coupler array 100 (e.g., the pixel-network waveguides 110 and the feed-network waveguides 118) may be, but are not required to be, formed using different optical architectures.

In another embodiment, the PIC coupler array 100 includes one or more controllers 122 to provide control signals via control lines 124 to the various optical switches throughout the PIC coupler array 100. In this regard, the controllers 122 may direct light along selected paths through the PIC coupler array 100 by selectively activating optical switches in the PIC coupler array 100.

The controllers 122 may include any type of controller suitable for selectively controlling the pixel-network switches 112. For example, a controller 122 may include an electrical controller that may send electrical control signals over electrical control lines 124 (e.g., electrically-conductive wires, or the like). By way of another example, a controller 122 may include an optical controller that may send optical control signals over optical control lines 124 (e.g., optical waveguides, or the like). Further, the controller 122 may be located on-chip, off-chip, or a combination thereof.

In one embodiment, the controller 122 includes one or more programmable circuit elements such as, but not limited to, a field-programmable gate array (FPGA). In another embodiment, the controller 122 includes one or more processors. In another embodiment, the one or more processors are configured to execute a set of program instructions maintained in a memory medium, or memory. Further, the controller 122 may include one or more modules containing one or more program instructions stored in the memory medium executable by the processors. The processors may include any processing element known in the art. In this sense, the processors may include any processing device or microprocessor-type device configured to execute algorithms and/or instructions. In one embodiment, the processors may consist of a desktop computer, mainframe computer system, workstation, image computer, parallel processor, or any other computer system (e.g., networked computer) configured to execute a program as described throughout the present disclosure. It is further recognized that the term "processor" may be broadly defined to encompass any device having one or more processing elements, which execute program instructions from a non-transitory memory medium.

The memory medium may include any storage medium known in the art suitable for storing program instructions executable by the associated processors. For example, the memory medium may include a non-transitory memory medium. As an additional example, the memory medium may include, but is not limited to, a read-only memory, a random-access memory, a magnetic or optical memory device (e.g., disk), a magnetic tape, a solid state drive and the like. It is further noted that memory medium may be housed in a common controller housing with the processors. In one embodiment, the memory medium may be located remotely with respect to the physical location of the processors and controller 122. For instance, the processors of controller 122 may access a remote memory (e.g., server), accessible through a network (e.g., internet, intranet and the like). Therefore, the above description should not be interpreted as a limitation on the present invention but merely an illustration.

It is contemplated herein that the optical switches within the PIC coupler array 100 may further generally operate in a "pass" mode in which light propagates along an uninterrupted path through the switch or in a "drop" mode in which the path of light is switched to a new path. For example, the pixel-network switch 112a in FIG. 1 is configured in a "pass" mode such that light propagating downward along the associated pixel-network waveguide 110 is undeterred (e.g., is not switched to the coupler 104a), whereas the pixel-network switch 112b in FIG. 1 is configured in a "drop" mode such that light propagating downward along the associated pixel-network waveguide 110 is directed to switched to the coupler 104b.

It is further contemplated herein that the optical switches within the PIC coupler array 100 may have a default state and an active state. For example, an electro-optical switch may operate in the default state without any applied voltage (or with a controlled voltage of approximately 0 volts) and may operate in the active state upon the application of a switch voltage. In a general sense, the default state of the optical switches throughout the PIC coupler array 100 may be either the "pass" state or the "drop" state. However, whether the default state is the "pass" state or the "drop" state may impact the energy usage of the PIC coupler array 100. In one embodiment, the default state of optical switches throughout the PIC coupler array 100 is the "pass" state and the active state is the "drop" state. In this regard, no (or minimal) energy is required to operate in the "pass" state. Since most of the switches along any given path through the PIC coupler array 100 are typically in the "pass" state, this configuration may provide energy-efficient operation.

For example, the PIC coupler array 100 illustrated in FIG. 1 is arranged to include a series of pixel-network waveguides 110 along the columns of pixels 102 in the PIC coupler array 100 and feed networks 114 along the top and bottom of the PIC coupler array 100. The feed-network switches 120 are controlled by one or more controllers 122a to provide selective coupling of light into or out of the column-oriented pixel-network waveguides 110. In this regard, the controllers 122a operate as column-select controllers 122. Further, the pixel-network switches 112 along rows of the PIC coupler array 100 of FIG. 1 are connected by common control lines 124 to a controller 122b such that the controller 122b operates as a row-select controller 122.

Figure 2:
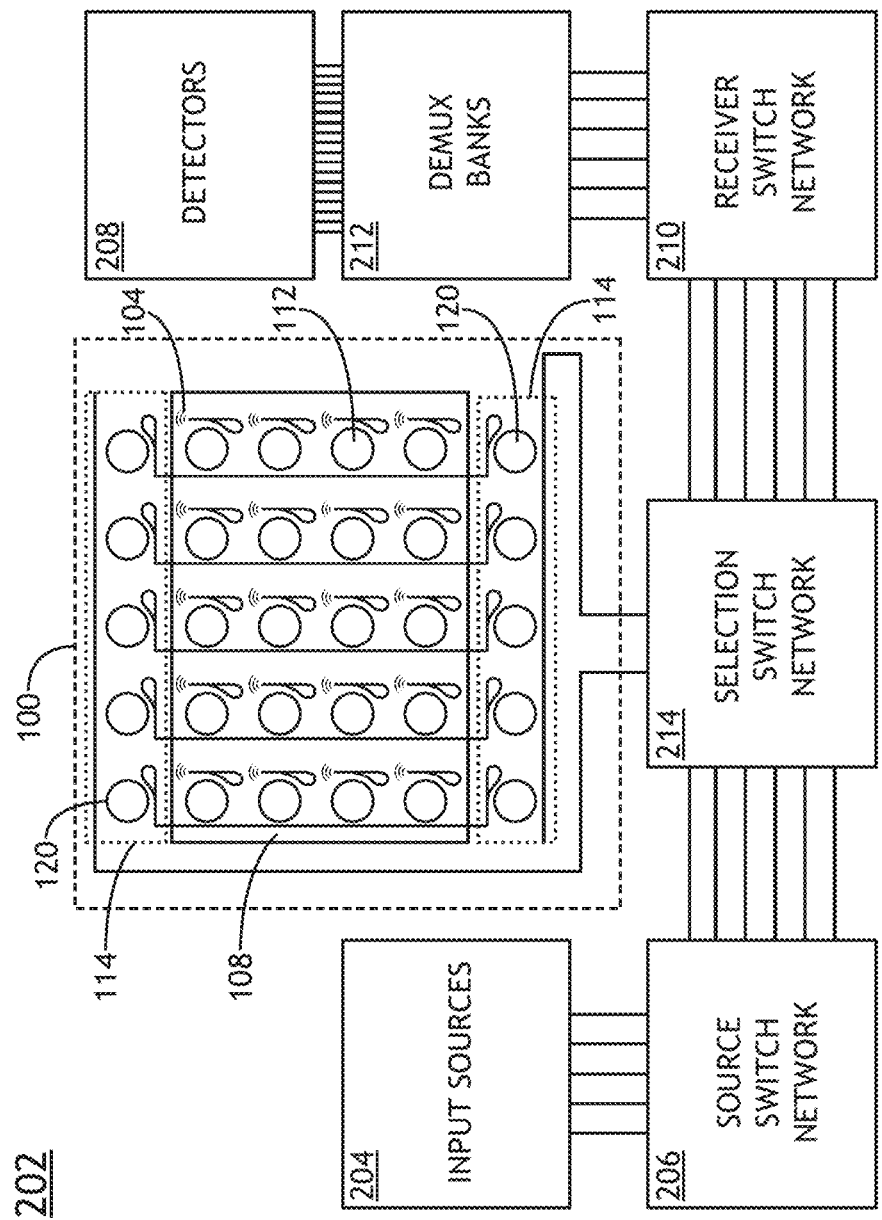
FIG. 2 is a schematic view of a system for incoupling and/or outcoupling of light from a PIC coupler array in accordance with one or more embodiments of the present disclosure.

Referring now to FIG. 2, the integration of a PIC coupler array 100 into a larger device (or system) is described in greater detail in accordance with one or more embodiments of the present disclosure.

FIG. 2 is a schematic view of a PIC device 202 for incoupling and/or outcoupling of light from a PIC coupler array 100 in accordance with one or more embodiments of the present disclosure.

In one embodiment, the PIC device 202 includes one or more input sources 204 to generate input signals that may be generated off-chip, on-chip, or a combination of the two. The signals from the input sources 204 may be routed to one or more pixels 102 for outcoupling. In another embodiment, as illustrated in FIG. 2, the PIC device 202 includes a source switch network 206 to selectively direct each input signal to a desired feed network 114. In this regard, control signals supplied to the feed-network switches 120 of the associated feed network 114 (e.g., by the controller 122 through the control lines 124) may route the corresponding input signal to a selected pixel-network waveguide 110. Further, control signals supplied to the pixel-network switches 112 may route (e.g., drop) the input signal to the selected pixel 102 of the PIC coupler array 100. The size and/or complexity of the source switch network 206 may be governed by the number of input signals, the number of feed networks 114, and/or the layout of the PIC coupler array 100 or associated PIC device 202.

The PIC device 202 may include any number and type of input sources 204 known in the art. For example, the PIC device 202 may include one or more on-chip light sources (e.g., integrated lasers, integrated light-emitting diodes (LEDs), or the like). In this manner, on-chip modulation may be used to generate optical signals or pulses providing a tightly-integrated system. By way of another example, the PIC device 202 may include one or more off-chip light sources. Further, an off-chip light source may be coupled onto a chip containing the PIC coupler array 100 using any technique known in the art including, but not limited to, input gratings, edge coupling, or external waveguides. Off-chip sources may be modulated to generate optical signals or pulses off-chip (before coupling) or on-chip (after coupling) using a variety of well-known techniques. Whether these signals are generated and/or modulated on-chip or off-chip, signals formed at different wavelengths can be combined (off-chip or on-chip) to create spectrally diverse signals carrying more information using standard wavelength division multiplexing (WDM) techniques.

In another embodiments, the PIC device 202 includes one or more optical detectors 208 to detect light incoupled by the PIC coupler array 100 and a receiver switch network 210 to direct received light from the pixels 102 to the optical detectors 208. The optical detectors 208 may include any type of optical detector known in the art including, but not limited to, photodiodes. Further, the PIC device 202 may include any combination of on-chip or off-chip optical detectors 208 coupled using any technique known in the art as described above with respect to the input sources 204.

Further, the PIC device 202 may include a demultiplexer (demux) bank 212. For instance, a demux bank 212 may provide spectral demultiplexing of received signals using an array waveguide grating (AWG) or series of resonant filters to separate each wavelength channel. Similar to the source switch network 206, the size and/or complexity of the receiver switch network 210 and/or the demux bank 212 may depend on the number of optical detectors 208 and/or the layout of the PIC coupler array 100. For example, if there are "N" different input signals (FIG. 2 illustrates a configuration with five input signals), the PIC device 202 may include the same number of lines out up to the demux bank 212. Accordingly, each signal may contain "C" channels at different wavelengths, where C may range from one to a few hundred (typical of WDM communication links). The demux bank 212 may separate N wavelength diverse signals into N*C single wavelength signals to be read by N*C optical detectors 208.

In another embodiment, the PIC device 202 includes a selection switch network 214 to facilitate bi-directional operation. For example, the selection switch network 214 may employ simple directional couplers (DCs) that couple incoming light from the source switch network 206 to the PIC coupler array 100, but couple return signals coming from the PIC coupler array 100 out to the receiver switch network 210 to provide full-duplex communication. Alternatively, if cross-talk due to backscatter interferes with range or bandwidth in full-duplex mode, active switches may be preferred in the selection switch network 214 to provide time-duplexing of transmitted and received signals. During the designated transmit interval the selection switch network 214 would be configured to route signals from the source switch network 206 to the PIC coupler array 100. Similarly, during the designated receive period, the selection switch network 214 would be configured to route signals from the PIC coupler array 100 to the receiver switch network 210. In some embodiments, real estate on the chip is allocated to perform spectral demultiplexing and detection on the same chip as the input signal processing to provide a highly-integrated free-space optical communication (FSOC) solution.

It is contemplated herein that the various switch networks described herein (e.g., the pixel switch network 108, the source switch network 206, the receiver switch network 210, the selection switch network 214, the demux bank 212, or the like) may be formed from any combination of active or passive switches or components. For example, passive components may include, but are not limited to, beamsplitters, beam combiners, directional couplers, or the like. By way of another example, active components may include, but are not limited to, electro-optic switches coupled to a controller (e.g., the controller 122, or the like). In one embodiment, the control circuitry and associated algorithms may be deployed on the same chip as the PIC coupler array 100. In another embodiment, the control circuitry and associated algorithms are hosted externally on a field-programmable gate array, microprocessor, central processing unit, or the like.

Further, it is to be understood that the PIC device 202 illustrated in FIG. 2 is provided solely for illustrative purposes and should not be interpreted as limiting. For example, a PIC coupler array 100 may be integrated into systems dedicated to transmitting light signals, which would not require the selection switch network 214, receiver switch network 210, optical detectors 208, or the demux bank 212 illustrated in FIG. 2. By way of another example, a PIC coupler array 100 may be integrated into systems dedicated to receiving of light signals, which would not require the selection switch network 214, source switch network 206, or input sources 204 illustrated in FIG. 2.

Figure 3:
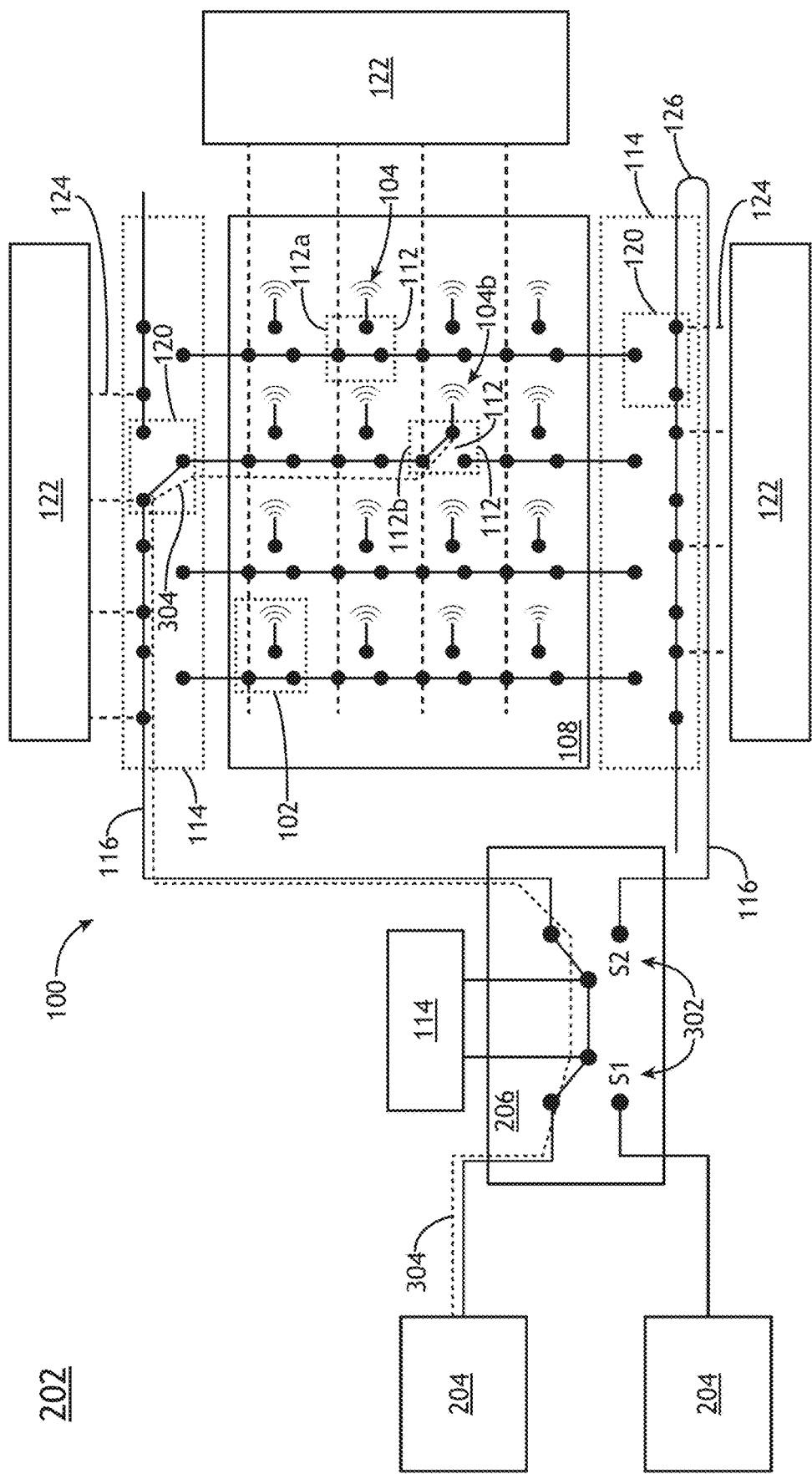
FIG. 3 is a simplified diagram of a system including a PIC coupler array providing selectable transmission from two input sources, in accordance with one or more embodiments of the present disclosure.

FIG. 3 is a simplified diagram of a PIC device 202 including a PIC coupler array 100 providing selectable transmission from two input sources 204, in accordance with one or more embodiments of the present disclosure. The PIC device 202 of FIG. 3 is includes the PIC coupler array 100 of in FIG. 1 for illustrative purposes. In the PIC device 202, Light from the input sources 204 may be directed to selected pixels using any combination of the pixel switch network 108 and a source switch network 206. In one embodiment, the PIC device 202 includes a source switch network 206 to couple one or more input sources 204 to selected feed-line waveguides 116. For example, the source switch network 206 includes two source-control switches 302 (S1 and S2) to direct light from one of two input sources 204 to one of two feed-line waveguides 116 leading to the PIC coupler array 100 (e.g., associated with the top and bottom of the PIC coupler array 100). In this regard, the combination of the source switch network 206 and the pixel switch network 108 may provide a dynamically-controllable path from a selected light source to a selected pixel in the PIC coupler array.

As an illustrative example, FIG. 3 indicates a signal path 304 from input source 204a to a selected coupler 104 (here coupler 104b) based on selective control of the source switch network 206 and the pixel switch network 108. In this example, an input signal is first routed to the feed-line waveguide 116 associated with the top of the PIC coupler array 100 and then further routed to the appropriate pixel-network waveguide 110 by the controller 122, where the light passes unselected pixel-network switches 112 until it reaches the selected pixel 102. The path is then extended to the coupler 104b of the selected pixel 102 through control of the corresponding pixel-network switch 112b by the controller 122. As described previously herein, the optical switches in the PIC device 202 (e.g., in the pixel switch network 108 and the source switch network 206) may be configured with a "pass" state to be the default operational state that requires little or no power input and a "drop" state to be the active state that requires power for operation. As illustrated in FIG. 3, the path 304 includes substantially more switches in the "pass" state than the "drop" state. Accordingly, configuring the switches with the "pass" state as the default state may provide power-efficient operation.

It is contemplated herein that multiple feed-line waveguides 116 may facilitate multiple selectable paths of light through the PIC device 202 to or from a selected pixel 102, which may be useful for a variety of reasons. For example, multiple selectable paths may facilitate managing propagation losses associated with a number of optical switches (e.g., pixel-network switches 112, source-control switches 302, or the like) along a path, which will be described in greater detail below. By way of another example, multiple selectable paths may facilitate simultaneous operation of multiple pixel-network switches 112. Additional embodiments incorporate logic (i.e. electrical switches) in the pixel switch network 108 along with multiple interconnects to activate individual pixel-network switches 112. For instance, an embodiment in which both column and row voltages are used to address pixels 102 in the PIC coupler array 100 will be described in greater detail below.

Further, although FIG. 3 illustrates a PIC device 202 configured for transmission of light from the PIC coupler array 100, it is contemplated herein the PIC device 202 could be similarly configured for reception of light by the PIC coupler array 100 as described with respect to FIG. 2. In this regard, any combination of a receiver switch network 210, a demux bank 212, optical detectors 208, or a selection switch network 214 may be included in place of or in addition to the input sources 204 and the source switch network 206. For example, a receiver switch network 210 may similarly provide a dynamically selectable path between one or more feed-line waveguides 116 and one or more optical detectors 208.

Figure 4:
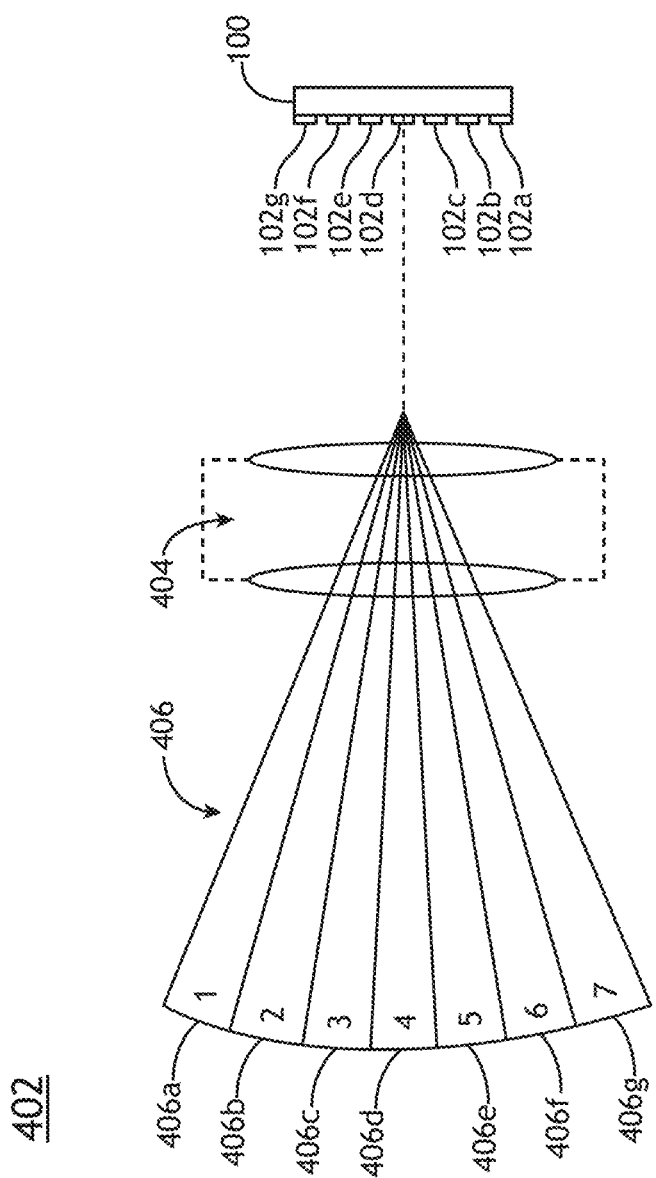
FIG. 4 is a schematic view of an IBBS system including a PIC coupler array, in accordance with one or more embodiments of the present disclosure.

Referring now to FIGS. 4 through 5B, IBBS systems incorporating PIC coupler arrays are described in greater detail. In accordance with one or more embodiments of the present disclosure. It is to be understood, however, that integration of a PIC coupler array 100 is provided for illustrative purposes only and should not be interpreted as limiting the present disclosure. Rather, a PIC coupler array 100 as disclosed herein may be integrated into any type of optical system and may be utilized for a variety of applications.

FIG. 4 is a schematic view of an IBBS system 402 including a PIC coupler array 100, in accordance with one or more embodiments of the present disclosure. In one embodiment, the IBBS system 402 includes a PIC coupler array 100 placed at a focal plane of a lens 404, which may include a single lens or a compound lens system. For example, as illustrated in FIG. 3, the lens 404 may include a telephoto lens system.

Accordingly, the spatial position of each pixel 102 of the PIC coupler array 100 may map to a solid angle 406 from the lens 404. For example, the simplified system illustrated in FIG. 4 illustrates seven pixels 102a-g that map to the seven solid angles 406a-g from the lens 404. These seven solid angles 406 may thus correspond to lines of sight (LOS) or steering angles that define the field of regard (FOR) of a free-space communications system. For example, light emitted (e.g., outcoupled) from pixel 102d may be directed along solid angle 406d, light emitted from pixel 102a may be directed along solid angle 406a, and the like. Further, such an arrangement may be suitable for incoupling, outcoupling, or bi-directional coupling by the PIC coupler array 100. Additionally, although FIG. 4 illustrates beam steering along seven solid angles 406 in a single direction, it is to be understood that a 2D distribution of pixels 102 on a PIC coupler array 100 may provide coupling to any desired multi-directional distribution of solid angles 406.

Figure 5A:
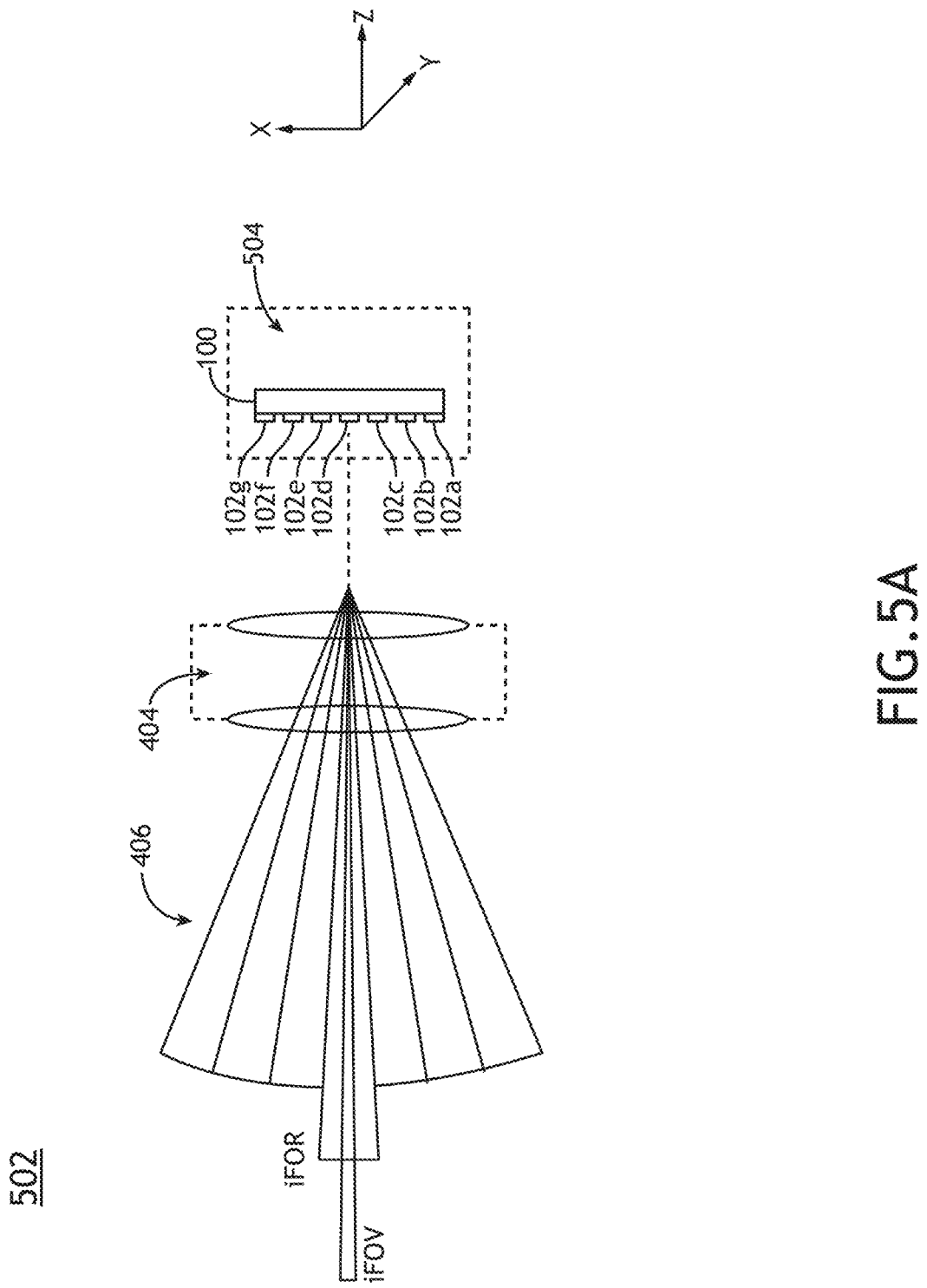
FIG. 5A is a conceptual diagram of a hybrid IBBS system including translation of a PIC coupler array (e.g., an emitter chip) located at a focal plane of a telescope lens, in accordance with one or more embodiments of the present disclosure.

Referring now to FIGS. 5A and 5B, hybrid IBBS systems incorporating PIC coupler arrays are described in greater detail in accordance with one or more embodiments of the present disclosure.

It is recognized herein that the resolution of an IBBS system incorporating a PIC coupler array 100 may be limited by the density of pixels 102. In some embodiments, one or more mechanical components are utilized to increase the IBBS system resolution. In this regard, the PIC coupler array 100 may provide course tuning of the steering angle and mechanical components may provide fine tuning.

FIG. 5A is a conceptual diagram of a hybrid IBBS system 502 including translation of a PIC coupler array (e.g., an emitter chip) located at a focal plane of a telescope lens, in accordance with one or more embodiments of the present disclosure.

The pixel-network switches 112 in a PIC coupler array 100 may provide emission at a discrete array of locations at the focal plane of the lens 404. In this regard, the locations of the couplers 104 in the PIC coupler array 100 may represent a sparse array of possible addressable locations in the focal plane (e.g., separated by distance W along the X and/or Y directions), where areas between couplers 104 may represent unaddressed locations in the focal plane.

In one embodiment, the PIC coupler array 100 is mounted to a 2D (e.g., X/Y) translation stage 504 suitable for translating the PIC coupler array 100 within the focal plane, which is also the coupler plane 106. In this regard, a selected pixel 102 of the PIC coupler array 100 may be positioned at any desired location within the focal plane within a resolution of the translation stage to provide any selected steering angle. Further, the PIC coupler array 100 need only be displaced by a distance of W/2 along the X and/or Y directions to efficiently address any location in the focal plane.

The translation stage securing the PIC coupler array 100 may include any type of translation stage in the art including, but not limited to, a MEMS stage, voice-coil, or piezoelectric actuators.

Further, although the above example describes translation of the PIC coupler array 100 by a translation stage, any combination of the PIC coupler array 100 or the lens 404 may be translated by any combination of translation stages such that the PIC coupler array 100 and the lens 404 may be translated with respect to each other.

FIG. 5B is a conceptual diagram of a hybrid IBBS system 506 including an adjustable mirror (e.g., a fast-steering mirror) 508 located between the lens 404 and the PIC coupler array 100, in accordance with one or more embodiments of the present disclosure.

For example, an adjustable mirror between the lens 404 and the PIC coupler array 100 may operate to modify the optical axis of the lens 404 with respect to the PIC coupler array 100. In this regard, a steering angle of light emitted from a selected pixel 102 of a PIC coupler array 100 may be finely tuned. Further, it is to be understood that the adjustable mirror may be placed at any location for tuning the coupling of light into or out of the PIC coupler array 100. For instance, the adjustable mirror may be located after the lens 404.

It is recognized herein that a hybrid IBBS system (e.g., as illustrated in FIGS. 5A and 5B) may facilitate efficient operation in bi-directional application by providing a mechanism for adjusting the coupling efficiency of light into and out of the PIC coupler array 100. However, it is further recognized herein that mechanical fine-tuning of a steering angle may negatively impact performance in multiplexed applications.

In another embodiment, though not shown, slight defocusing of the couplers 104 from the focal plane of the lens 404 can be used to defocus the light from the PIC coupler array 100 and provide full coverage across the FOR, even with gaps between couplers of adjacent pixels. Defocusing, however, may generally increase beam divergence and may thus reduce range performance. Accordingly, this mechanism may facilitate a design tradeoff between pixel pitch, FOR and beam divergence (which impacts range).

In another embodiment, though not shown, the light coupled into or out of the PIC coupler array 100 may be tuned using a phase modifier either between the PIC coupler array 100 and the lens 404 or after the lens 404. In this regard, the phase modifier may introduce a small displacement that may be used for tuning. For example, a phase modifier suitable for tuning the light coupled into or out of the PIC coupler array 100 may include, but is not limited to, a spatial light modulator.

Referring now to FIGS. 6A through 9, various types of optical switches suitable for use in a PIC coupler array 100 or a corresponding PIC device 202 are described in greater detail in accordance with one or more embodiments of the present disclosure. For example, the optical switches described herein may include switches in any of a pixel switch network 108, a source switch network 206, a receiver switch network 210, a selection switch network 214, a demux bank 212, or the like.

A PIC coupler array 100 or a corresponding PIC device 202 may include any type of optical switch known in the art such as, but not limited to, a ring resonator switch (e.g., an electrically or thermally tuned ring resonator switch, or the like), a MEMs adiabatic coupler, or a Mach-Zehnder interferometer (MZI) switch. In a general sense, an optical switch may be actuated to either "pass" the signal (i.e. not switch) on to a default waveguide or "drop" or otherwise switch the signal onto a different waveguide.

Figure 6A:
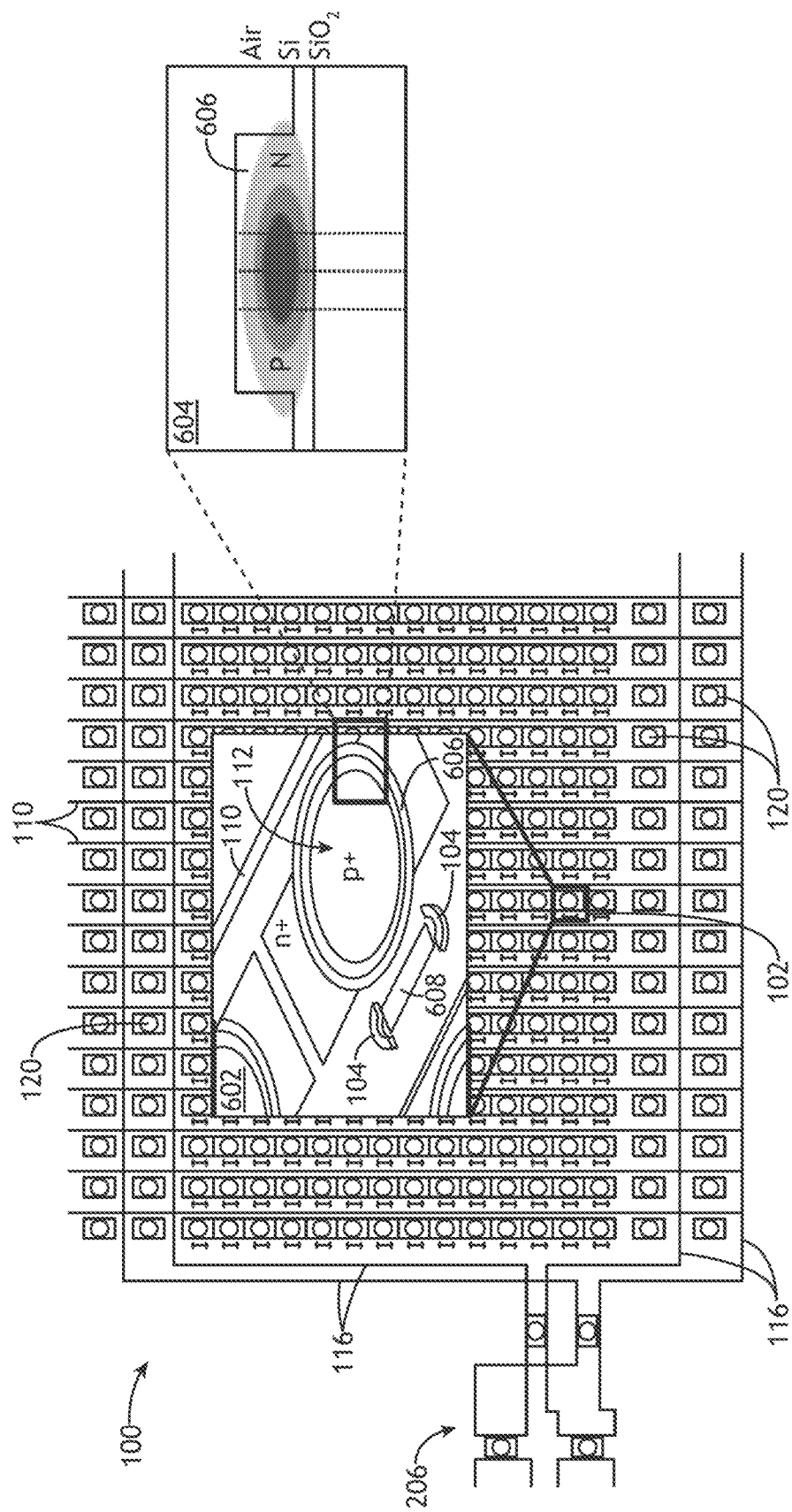
FIG. 6A is a top view of a system including optical switches formed as depletion-mode ring resonator switches in accordance with one or more embodiments of the present disclosure.

FIG. 6A is a top view of a PIC device 202 including optical switches formed as depletion-mode ring resonator switches in accordance with one or more embodiments of the present disclosure.

In the system illustrated in FIG. 6A, the PIC coupler array 100 receives off-chip optical signals and dynamically routes them to selected pixels 102 in a 16×16 array. For example, such a PIC coupler array 100 may be integrated into an IBBS system (e.g., as illustrated in FIGS. 4 through 5B, or the like), where an IBBS lens (e.g., the lens 404) would passively steer the outcoupled signals into conjugate lines of sight or steering angles.

In particular, the PIC device 202 illustrated in FIG. 6A includes four grating-coupled inputs routable via a source switch network 206 to any one of feed-line waveguides 116 via a 2×2 network of electrostatically switched ring-resonator source-control switches 302. The signal may then be directed into any one of 16 pixel-network waveguides 110 along the columns of the PIC coupler array 100 with "column-select" pixel-network switches 112. The signal may then be directed to a selected pixel 102 by controlling a corresponding pixel-network switch 112 (e.g., with a control signal along row-select control lines 124 (not shown)), where it may be directed to a coupler 104 in the selected pixel 102. It is recognized herein that this design may provide versatile routing of up to four optical signals simultaneously, which may enable four high-bandwidth free-space optical communication links with remote transceivers.

The inset 602 illustrates an expanded perspective view of a pixel 102 including a depletion-mode ring resonator switch and two couplers 104. The inset 604 includes a cross-sectional view of the depletion-mode ring resonator illustrating a mode profile of light in the resonator.

Figure 6B:
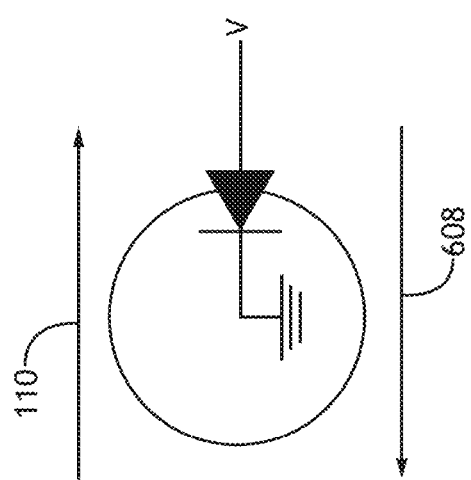
FIG. 6B is a circuit diagram of such a depletion-mode ring-resonator switch in accordance with one or more embodiments of the present disclosure.

For example, as illustrated in FIG. 6A, a ring resonator switch may include a ring waveguide 606 proximate to a pixel-network waveguide 110 and a coupling waveguide 608 connected to one or more couplers 104. Further, a ring resonator switch may include electrical contacts on a central portion of the ring as well as under the ring structure (e.g., labeled as p+ and n+ regions, respectively, in inset 602 of FIG. 6A). FIG. 6B is a circuit diagram of such a depletion-mode ring-resonator switch in accordance with one or more embodiments of the present disclosure. Accordingly, light on the pixel-network waveguide 110 may be selectively coupled to the coupling waveguide 608 (or vice versa) based on a voltage applied across the ring structure through the electrical contacts.

A pixel 102 of a PIC coupler array 100 may include any number of couplers 104 for incoupling and/or outcoupling of light from the coupler plane 106. For example, as illustrated in the inset 602 of FIG. 6A, a pixel 102 may include two couplers 104 coupled to a common coupling waveguide 608 in order to provide multi-directional coupling to the adjacent pixel-network waveguide 110. The PIC coupler array 100 shown in FIG. 6A includes pixel-network waveguides 110 and associated pixel-network switches 112 (e.g., column-select pixel-network switches 112) located on both ends of each column of pixels 102. Thus, the pixel-network switch 112 in the inset 602 may receive light from the pixel-network waveguide 110 along multiple directions (e.g., from the top or from the bottom as depicted in FIG. 6A). In the case of ring resonator switches, the direction in which light is coupled from a pixel-network waveguide 110 to a coupling waveguide 608 differs based on the propagation direction of light in the pixel-network waveguide 110. Accordingly, as shown in the inset of FIG. 6A, a pixel 102 may include two couplers 104 on opposite ends of the coupling waveguide 608 to handle counter-propagating inputs from the adjacent pixel-network waveguide 110. Further, it is contemplated herein that the two couplers 104 may be sufficiently close together in the pixel 102 that the difference in spatial position may be negligible in many applications. Considering an IBBS application, although light coupled into or out of the two couplers 104 of a given pixel 102 may map to slightly different solid angles 406 as described previously herein, the difference may be negligible and/or may be mitigated by techniques such as, but not limited to, the techniques described with respect to FIGS. 5A and 5B. By way of another example, a pixel 102 may include a single coupler 104 and a feedback loop 126 to ensure that all light is directed to the single coupler 104. In this regard, the feedback loop 126 may enable a pixel 102 having a ring resonator switch to receive light from or couple light to corresponding pixel-network waveguides 110 along multiple directions.

A PIC coupler array 100 may generally be suitable for high-bandwidth optical signals including, but not limited to, a wavelength-division-multiplexed (WDM) comb signal. Further, multiple types of optical switches may provide high-bandwidth switching capabilities.

Figure 7A:
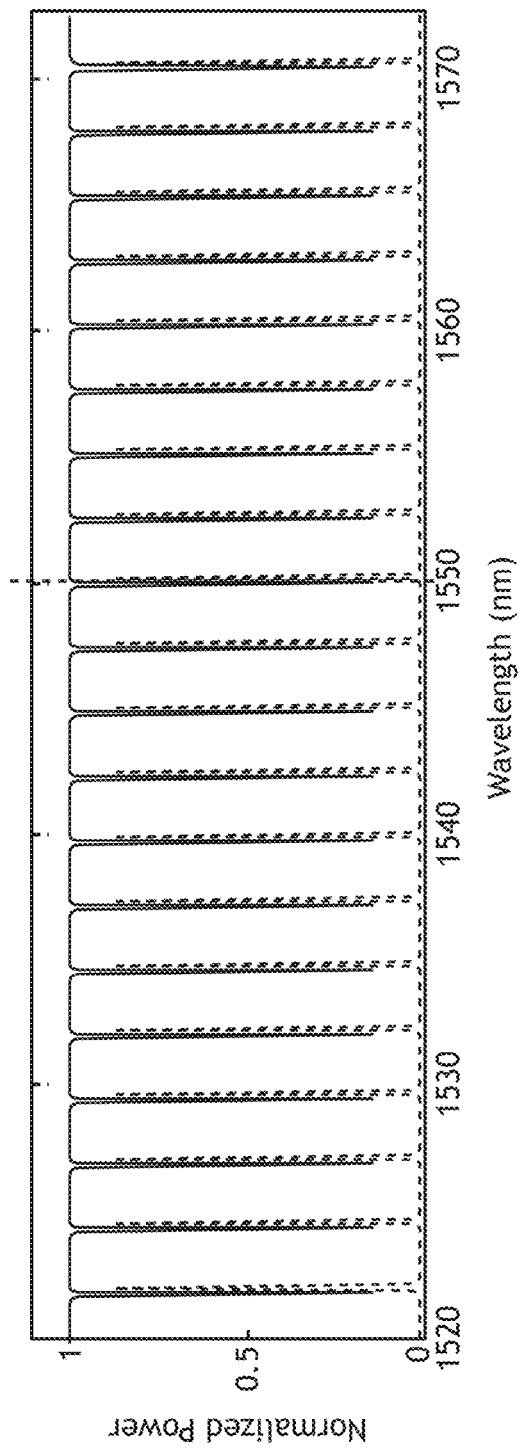
FIG. 7A is a plot of passed and dropped WDM comb signals, in accordance with one or more embodiments of the present disclosure.
Figure 7B:
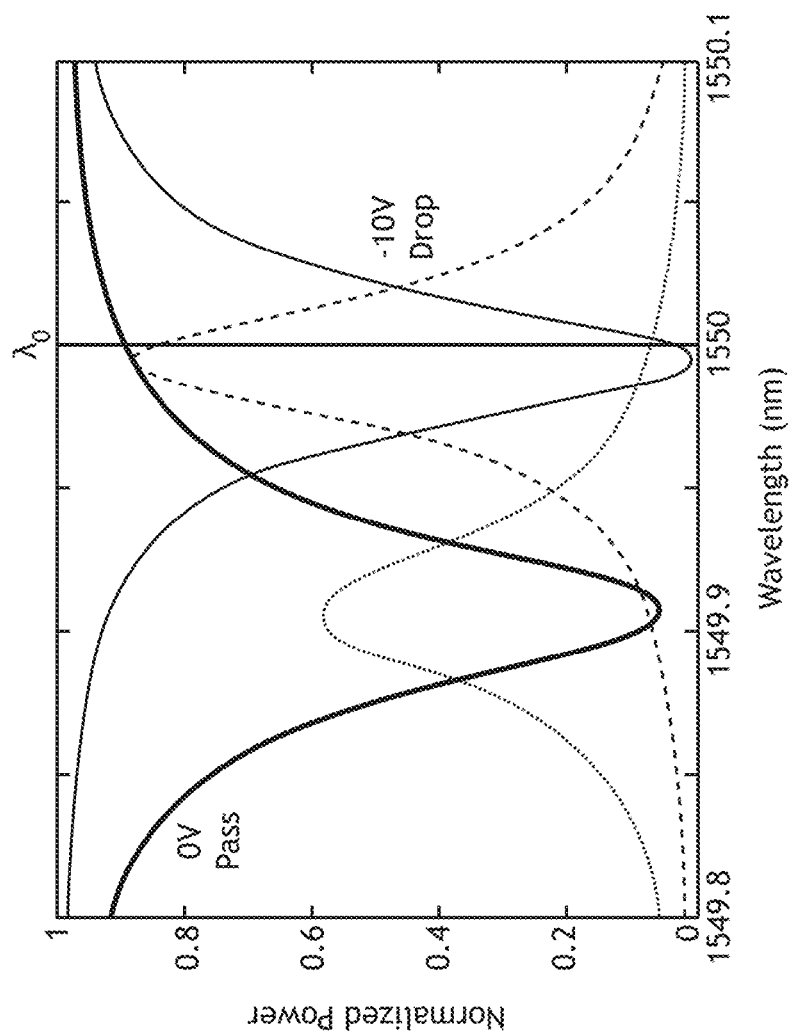
FIG. 7B is a plot of passed and dropped signals around a single comb frequency ($\lambda_o$) of FIG. 7A, in accordance with one or more embodiments of the present disclosure.

FIGS. 7A and 7B illustrate the switching characteristics of depletion-mode ring resonator switches shown in FIG. 6A, in accordance with one or more embodiments of the present disclosure. FIG. 7A is a plot of passed and dropped WDM comb signals, in accordance with one or more embodiments of the present disclosure. FIG. 7B is a plot of passed and dropped signals around a single comb frequency ($\lambda_0$) of FIG. 7A, in accordance with one or more embodiments of the present disclosure. Such resonators may be designed to switch optical comb signals across the S/C/L bands (1460-1625 nm).

It is contemplated herein that depletion-mode ring resonator switches may provide resonances matched to all WDM comb lines of an input signal to simultaneously pass or drop all WDM comb lines of the input signal. Accordingly, the switches may provide efficient switching of high-bandwidth signals.

In one embodiment, the switches illustrated in FIG. 6A may switch WDM comb signals with 96 GHz linewidth spaced by FSR=4 nm providing maximum throughput greater than 1 Tbps along a single line of sight; this bandwidth is further limited by resonator Q and dispersion. These switches pass the signal with insertion loss of T=−0.5 dB without bias (0 V); drop voltage, $V_{drop}$=−10 V, activates a switch to drop the signal with a loss of D=−0.62 dB. An estimated 20 nW is consumed biasing resonators to route the beam and perform 2-dimensional (2D) beam-steering.

Figure 8A:
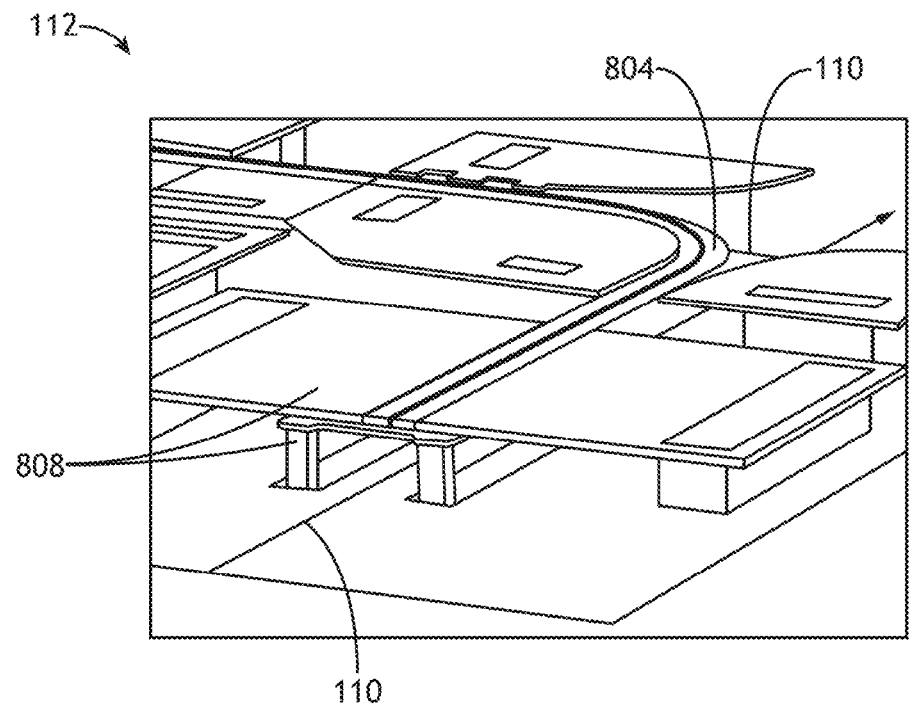
FIG. 8A is an expanded perspective view of a MEMS adiabatic coupler operating as an optical switch.
Figure 8B:
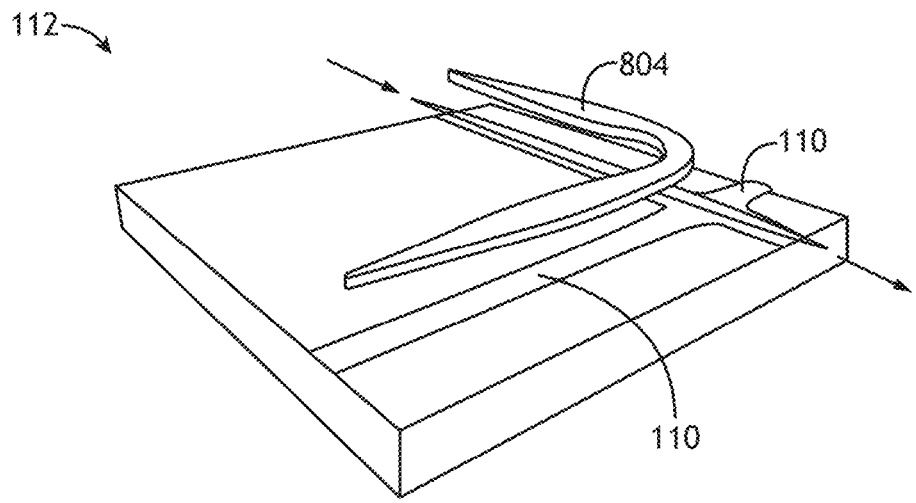
FIG. 8B is a perspective view of the configuration of the MEMS adiabatic coupler in an OFF or "pass" state associated with no deflection of light in the feed waveguide, in accordance with one or more embodiments of the present disclosure.
Figure 8C:
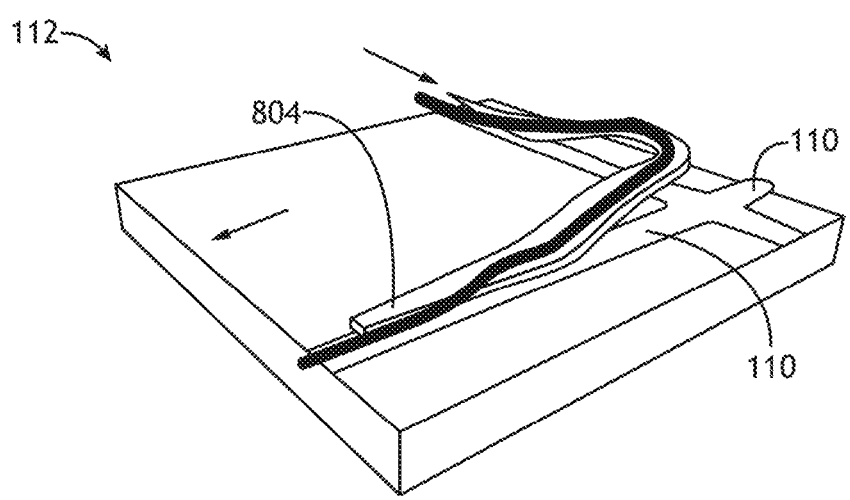
FIG. 8C is a perspective view of the configuration of the MEMS adiabatic coupler in an ON or "drop" state associated deflection of light from the feed waveguide, in accordance with one or more embodiments of the present disclosure.

FIGS. 8A-8C includes a top view of a PIC device 202 including optical switches formed as MEMS adiabatic couplers, in accordance with one or more embodiments of the present disclosure.

FIG. 8A is a perspective view of a PIC coupler array 100 including optical switches formed from MEMS adiabatic couplers, in accordance with one or more embodiments of the present disclosure. FIG. 8A is an expanded perspective view of a MEMS adiabatic coupler operating as an optical switch. FIG. 8B is a perspective view of the configuration of the MEMS adiabatic coupler in an OFF or "pass" state associated with no deflection of light in the pixel-network waveguide 110, in accordance with one or more embodiments of the present disclosure. FIG. 8C is a perspective view of the configuration of the MEMS adiabatic coupler in an ON or "drop" state associated deflection of light from the pixel-network waveguide 110, in accordance with one or more embodiments of the present disclosure.

As illustrated in FIGS. 8A through 8C, a MEMS adiabatic coupler may include a support structure 802 to support a MEMS-actuated adiabatic coupler waveguide 804 positioned above an intersection of two pixel-network waveguides 110 and curves from one pixel-network waveguide 110 to the other through the intersection. In an OFF state, as illustrated in FIG. 8B, the MEMS-actuated adiabatic coupler waveguide 804 remains above both pixel-network waveguides 110 such that light propagates undisturbed. In an ON state, as illustrated in FIG. 8C, tips of the MEMS-actuated adiabatic coupler waveguide 804 are actuated downward to couple with the pixel-network waveguides 110, which causes light to travel through the MEMS-actuated adiabatic coupler waveguide 804 and transition from one pixel-network waveguide 110 to the other.

Figure 9:
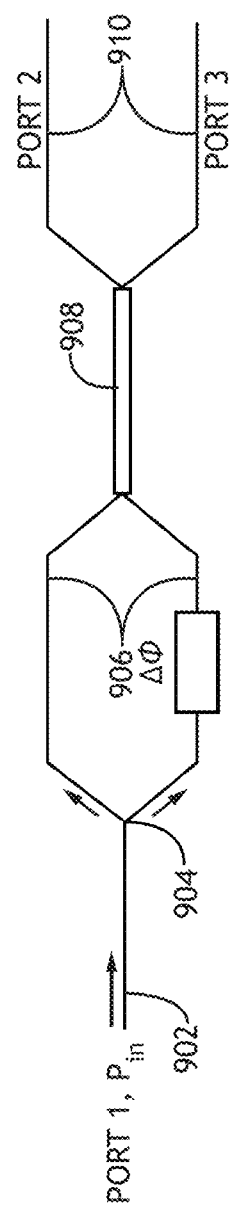
FIG. 9 is a schematic view of an optical switch formed as a Mach-Zehnder Interferometer (MZI) switch, in accordance with one or more embodiments of the present disclosure.

FIG. 9 is a schematic view of an optical switch formed as a Mach-Zehnder Interferometer (MZI) switch, in accordance with one or more embodiments of the present disclosure. In one embodiment, a MZI switch includes an input port 902 (e.g., Port 1/$P_{in}$), a splitter 904 to split light into two paths 906, and directional coupler 908 to provide two output ports 910 (e.g., Ports 2 and 3). The MZI switch may further include a phase-modification device (e.g., one or more electrodes) to impose a phase change on one or more paths 906, where the relative intensity of light exiting the output ports 910 is controllable based on an optical phase difference ($\Delta\phi$) in the paths 906. For example, an optical phase difference $\Delta\phi=0$ may direct all light from Port 1 to Port 3, whereas an optical phase difference $\Delta\phi=\pi$ may direct all light from Port 1 to Port 2. However, it is to be understood that the MZI switch illustrated in FIG. 9 is provided solely for illustrative purposes and should not be interpreted as limiting. An MZI switch may have any design known in the art suitable for providing optical switching. MZI switch designs are generally described in Xin Tu, et. al State of the Art and Perspectives on Silicon Photonic Switches, Micromachines 10(1), 51 (2019), which is incorporated by reference herein in its entirety.

It is recognized herein that different switch types may exhibit different strengths and weaknesses such that the switch type may be selected based on specific requirements of a particular application. For example, MEMS switches may provide polarization-insensitive routing with relatively high bandwidth switching than ring resonator switches due to non-resonant coupling operation. MEMS switches may also potentially exhibit relatively low losses. For instance, a MEMS adiabatic coupler as illustrated in FIGS. 8A-8D may exhibit low insertion loss (e.g., at or below 0.11 dB) and stable transmission (e.g., <5 db variation) across a broad spectral range due to the non-resonant operation. By way of another example, ring resonators may be fabricated using conventional CMOS processes at lower cost that a similar MEMS switch. Additionally, the lifetime of a resonant circuit is expected to be larger than a MEMs device due to the lack of moving membranes. By way of another example, MZI switches may also provide polarization-insensitive routing in a CMOS-compatible platform, but may have a relatively large footprint.

Various architectures of feed waveguides and source switch networks and associated loss characteristics are described in greater detail.

A system including a PIC coupler array 100 may include any number or combination of pixel-network waveguides 110 and feed-line waveguides 116 to provide paths between input sources 204 and pixels 102 in the PIC coupler array 100. Further, a mapping between input sources 204 and pixels 102 may be static or dynamically determined.

It is contemplated herein that the maximum number of links a PIC coupler array 100 can support may generally be limited by the lesser of the number of input sources 204 or pixel-network waveguides 110. Further, the number of switches (e.g., switches in a pixel switch network 108, a source switch network 206, a receiver switch network 210, a selection switch network 214, a demux bank 212, or the like) in a PIC device 202 may depend on the number of links. For example, referring again to FIG. 2, input sources 204 providing a number of independent links ($N_{links}$) may require a source switch network 206 having approximately $N_{links} \times N_{feednets}$ nodes, where $N_{feednets}$ is the number of feed networks 114 leading to the PIC coupler array 100. Each feed network 114 is expected to contain at least a minimum number of nodes determined by the number of inputs it connects to a designated number of feed-line waveguides 116 ($N_{feedlines}$) For example, a binary tree (e.g., as illustrated in FIG. 12B below) linking one input to $N_{feedlines}$ requires base2–log($N_{feedlines}$) levels as illustrated in FIG. 12B. By way of another example, a demux bank 212 providing N links ($N_{links}$) may require ($N_\lambda \cdot N_{links}$) optical detectors 208, where $N_A$ is a number of spectral channels provided by the demux bank 212.

In one embodiment, each active input source 204 is statically assigned or otherwise mapped to particular feed-line waveguide 116, a particular pixel-network waveguide 110, and/or a particular pixel 102. For example, the mapping may be selected based on signal/LOS mapping requirements or an identified global optimum routing solution. In another embodiment, each active input source 204 is dynamically assigned or otherwise mapped to selected feed-line waveguides 116, pixel-network waveguides 110, and/or pixels 102. In this regard, the selection of a path to the selected pixel 102, or a portion thereof, may be dynamically selected or configured during runtime. Further, the configuration may be dynamically modified as the optimal pointing solution evolves for any reason including, but not limited to, providing multi-channel operation (e.g., multiple simultaneously active pixels 102), bi-directional operation, motion of self, motion of remote transceivers, the addition of new links, or the removal (or dropping) of existing links. This update rate may further be limited by the electrical switching speeds of the circuit, but these are expected to be much larger than typical LOS slew requirements.

In one embodiment, a controller 122 (e.g., a controller for a pixel switch network 108, a source switch network 206, a receiver switch network 210, a selection switch network 214, a demux bank 212, or the like) receives one or more address states, where each of the one or more address states includes a selected input source 204 and a selected pixel 102 from the PIC coupler array 100. Further, the controller 122 may select a path for each of the one or more address states. In another embodiment, the controller 122 selectively controls (e.g., by generating one or more electronic drive signals) the corresponding components along the paths associated with the one or address states with the proper timing to emit light from the PIC coupler array 100 according to the one or more address states Further, the selection of the paths may be based on any metric. For instance, the controller may select a path that minimizes or otherwise reduces routing losses below a selected threshold. In another instance, in a multiplexed application, the paths may be selected such to minimize interference between simultaneous signals propagating through the PIC coupler array 100.

Figure 10A:
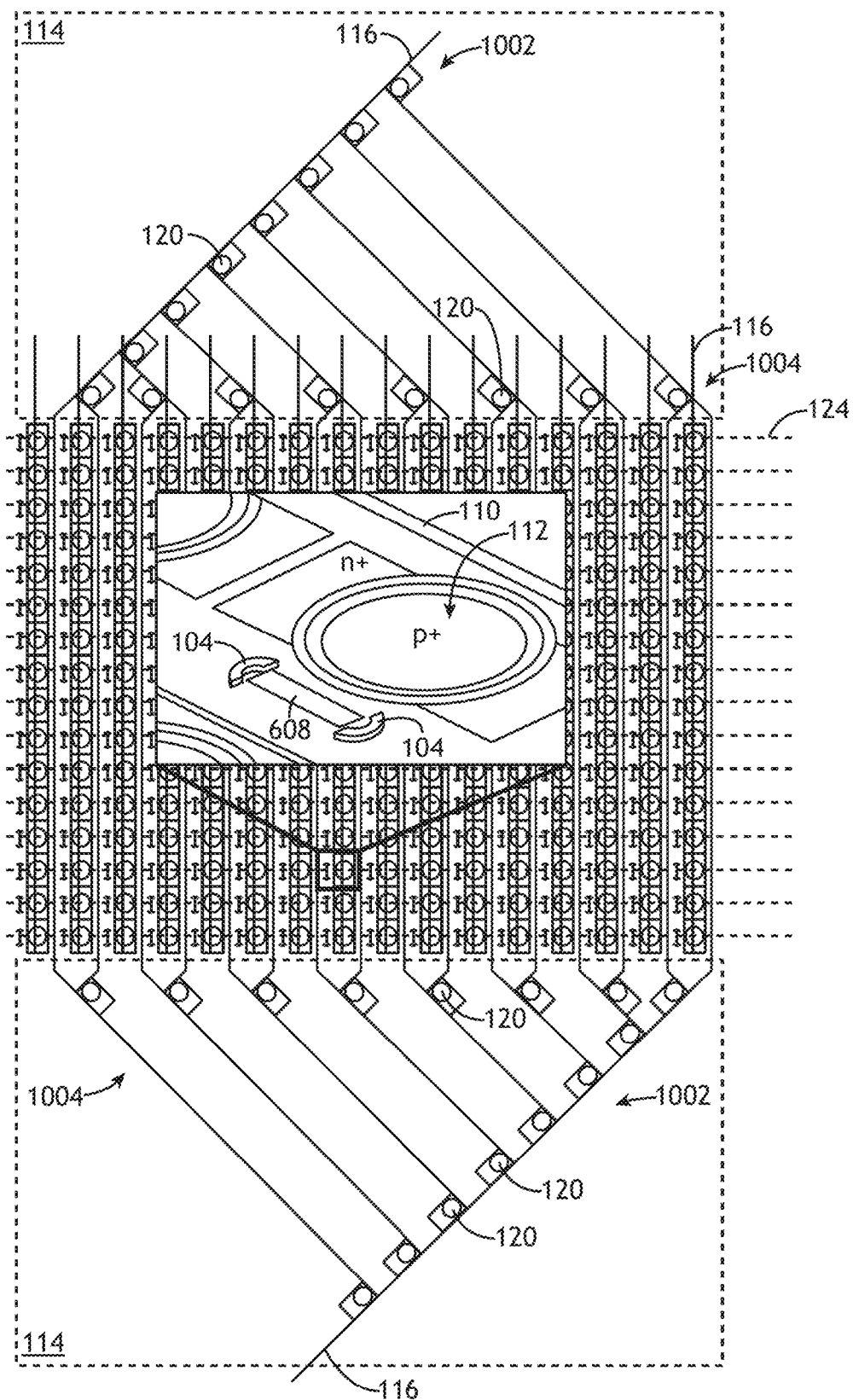
FIG. 10A is a top view of a system including a PIC coupler array including ring resonator switches, but with a different configuration of feed networks than FIG. 6A, in accordance with one or more embodiments of the present disclosure.

FIG. 10A is a top view of a PIC device 202 including a PIC coupler array 100 including ring resonator switches, but with a different configuration of feed networks 114 than FIG. 6A, in accordance with one or more embodiments of the present disclosure. The PIC device 202 illustrated in FIG. 10A includes pixel-network waveguides 110 running along each of the columns similar to the PIC device 202 illustrated in FIG. 6A. However, the PIC device 202 illustrated in FIG. 10A does not include separate feed-network switches 120 for each of the pixel-network waveguides 110 running along columns or a binary tree (e.g., as illustrated in FIG. 12B). Rather, the PIC device 202 uses a blend of these two network types. In particular, the PIC device 202 in FIG. 10A includes a first level 1002 of feed-network switches 120 to select between pairs of the pixel-network waveguides 110 and a second level 1004 of feed-network switches 120 to couple light to the pixel-network waveguides 110. In this regard, the number of optical switches encountered along a path may be reduced for at least some of the paths to reach selected pixels 102.

Figure 10B:
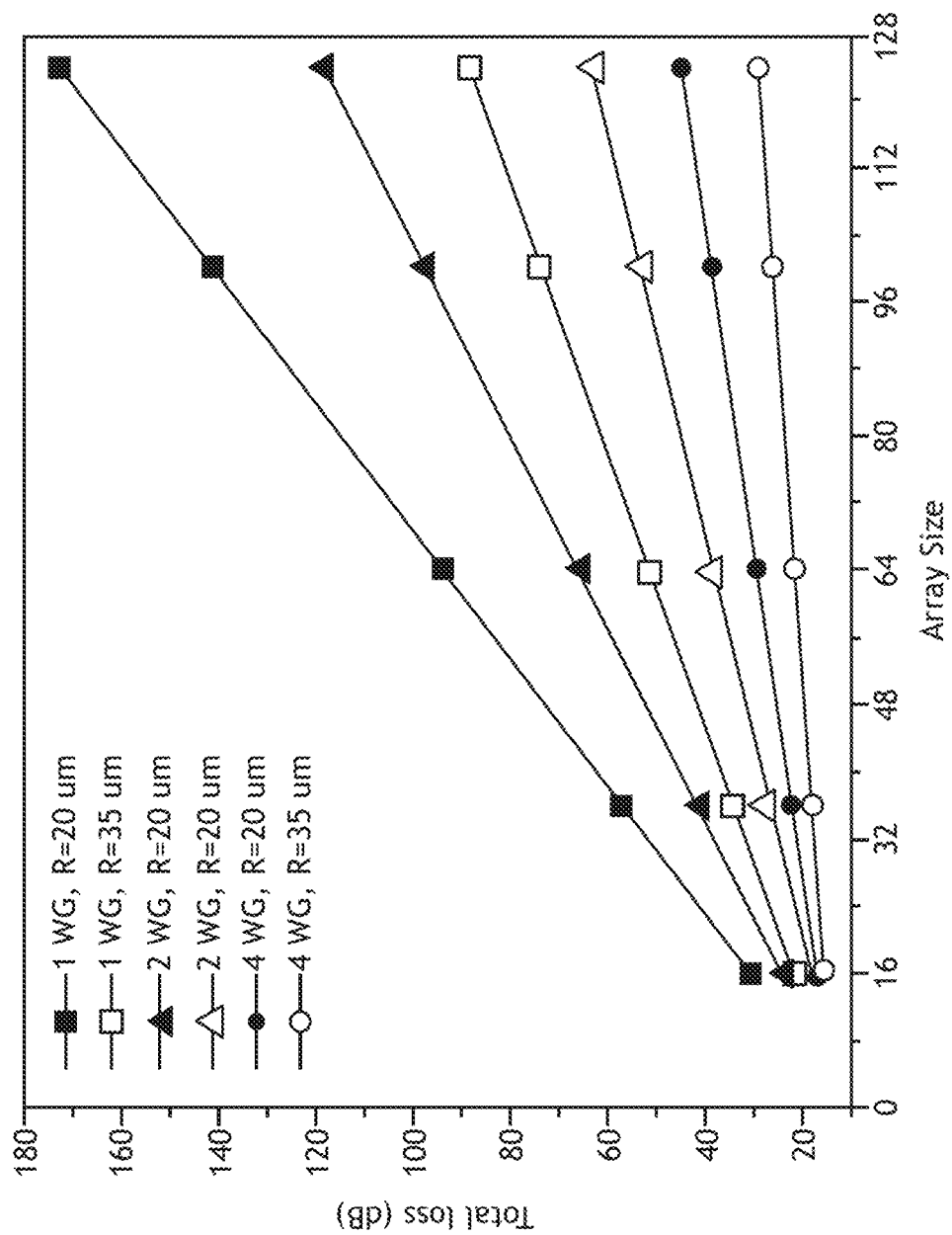
FIG. 10B is a plot illustrating propagation loss of the system in FIG. 10A as a function of array size for various configurations of the PIC coupler array, in accordance with one or more embodiments of the present disclosure.

FIG. 10B is a plot illustrating propagation loss of the system in FIG. 10A as a function of array size for various configurations of the PIC coupler array 100, in accordance with one or more embodiments of the present disclosure. In this plot, "WG" refers to a number of feed networks 114 in the PIC coupler array 100. For example, "1 WG" indicates that the PIC coupler array 100 includes one feed network 114 (e.g., either from the top or bottom), "2 WG" indicates two feed networks 114 (e.g., one from the top and one from the bottom), and "4 WG" indicates four feed networks 114 (e.g., two at top and two at bottom). Further, "R" refers to a radius of ring resonators in the associated optical switches.

In some embodiments, a PIC device 202 may be configured with three or more feed-line waveguides 116 to further increase the number of paths to selected pixels 102 and further decrease the number of pixel-network switches 112 along the paths.

Figure 11A:
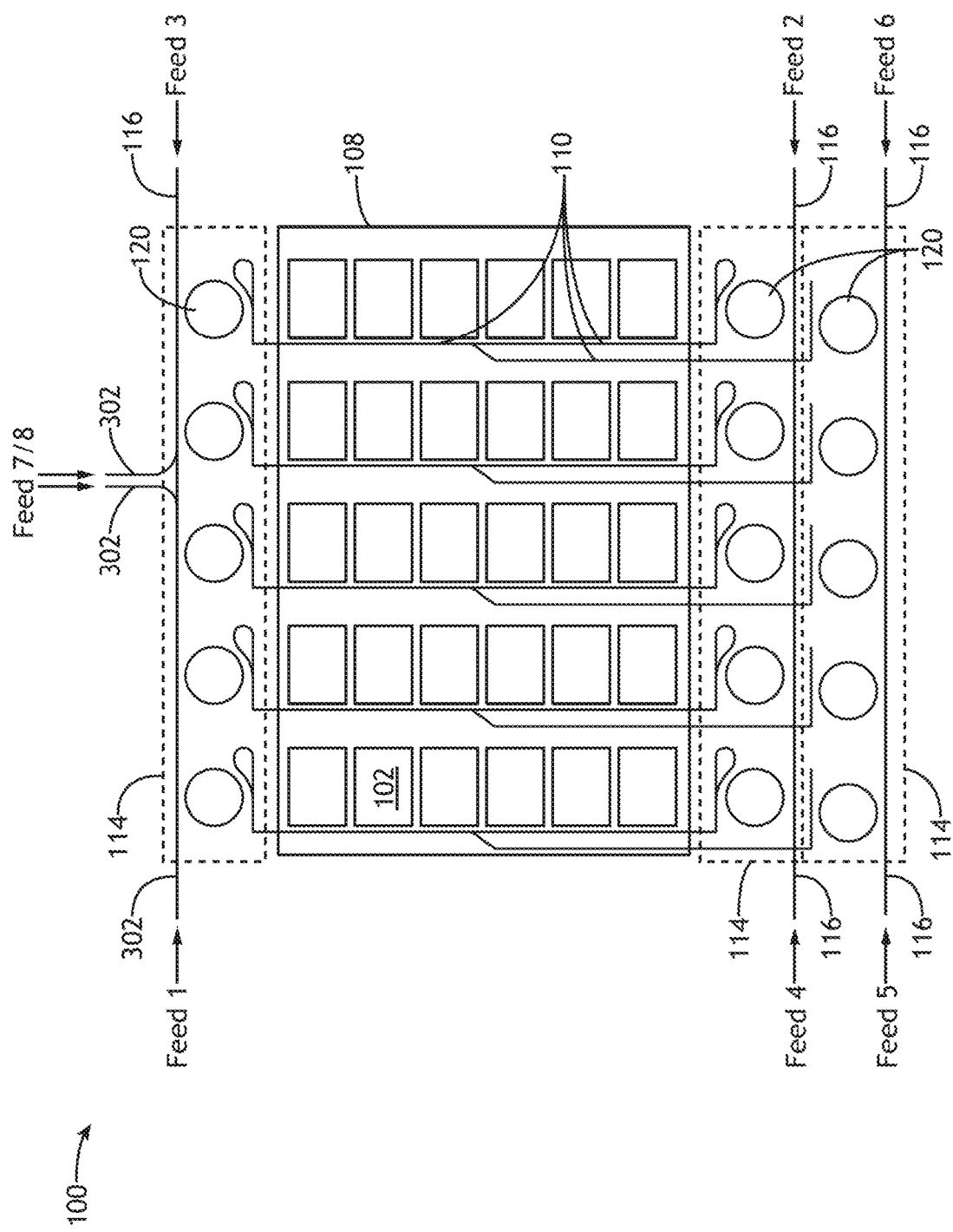
FIG. 11A is a conceptual view of a 6×5 PIC coupler array having seven feed lines, in accordance with one or more embodiments of the present disclosure.

FIG. 11A is a conceptual view of a 6×5 PIC coupler array 100 having eight feed-line waveguides 116 feeding into three independent feed networks 114, in accordance with one or more embodiments of the present disclosure. In this configuration, a pixel switch network 108 may include feed-line waveguides 116, labeled as Feeds 1-8 that couple with pixel-network waveguides 110 running along the columns of the PIC coupler array 100. For example, Feeds 1 and 3 may provide counter-propagating inputs to a series of column-select feed-network switches 120 running along the top of the PIC coupler array 100. In this regard, Feed 1 may be used to select pixels 102 on the left half of the PIC coupler array 100 and Feed 3 may be used to select pixels 102 on the right half of the PIC coupler array 100 in order to reduce the number of optical switches encountered in a selected path. Similarly, Feeds 2 and 4 may provide counter-propagating inputs to a series of column-select feed-network switches 120 running along the bottom of the PIC coupler array 100. In this regard, Feeds 2 and 4 may be used to address pixels 102 in the bottom half of the PIC coupler array 100 and Feeds 1 and 3 may be used to address pixels 102 in the top half of the PIC coupler array 100 to further reduce the number of optical switches encountered in a selected path. In one embodiment, separate feeds from top and bottom (e.g. Feed 1 and Feed 2 in FIG. 4A) allow two inputs to be routed into the same column from different directions. In this regard, input signals from two input sources 204 may be routed onto the same column in opposite directions using Feed 1 and 2; Feed 1 would be used to address a higher pixel while Feed 2 would be used to address a lower pixel.

In another embodiment, one or more pixel-network waveguides 110 may directly feed pixels 102 in the interior of the PIC coupler array 100 by bypassing one or more rows. For example, as illustrated in FIG. 11A, Feeds 5 and 6 are coupled to a series of column-select pixel-network switches 112 that may selectively drop an input signal into column pixel-network waveguides 110 that address only the top three rows of the PIC coupler array 100 by bypassing the bottom three rows. In this regard, an input signal propagating through Feed 5 may avoid losses associated with pixel-network switches 112 along the bottom three rows of pixels 102.

In another embodiment, a PIC device 202 may include one or more feed-line waveguides 116 to bypass columns of pixels 102 to further reduce propagation losses. For example, as illustrated in FIG. 11A, Feeds 7 and 8 may address the left three and the right two columns, respectively.

The routing loss associated with propagation along a selected path may depend on the number of switches along the path. For example, a switch may exhibit a loss associated with both a pass state and a drop state. Accordingly, transmitted power efficiency through a path may be characterized as:

$$T = P^{N_{Pass}} D^{N_{Drop}} \quad (1)$$

where P is the transmitted power fraction of a switch in the pass state, D is the transmitted power fraction in a drop state, $N_{pass}$ is a number of switches in a pass state along a route, and $N_{Drop}$ is a number of switches in a drop state along the route. Further, the PIC coupler array 100 may exhibit additional losses such as, but not limited to, waveguide transmission, bends or crossings. However, these losses may be relatively relative to the pass and drop losses.

Based on Equation (1), routing losses may rapidly increase as the number of pixels in a PIC coupler array increases. Accordingly, various configurations of feed waveguides and switches in a source switch network may be utilized to reduce routing losses and increase the operational efficiency of a PIC coupler array.

Figure 11B:
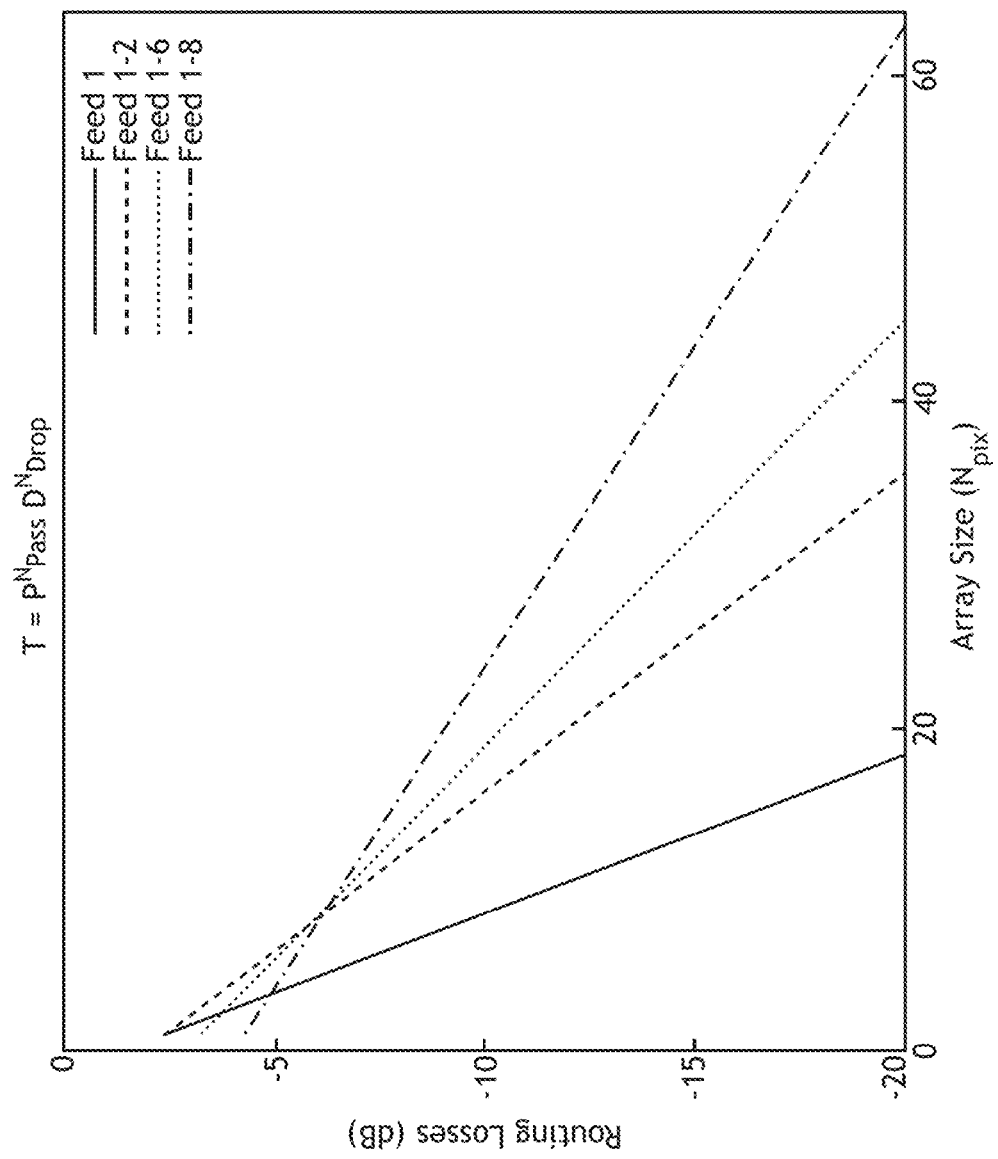
FIG. 11B is a plot illustrating routing losses associated with signal paths associated with multiple configurations of feed waveguides in a source switch network as a function of array size, in accordance with one or more embodiments of the present disclosure.

FIG. 11B is a plot illustrating routing losses associated with signal paths associated with multiple configurations of feed waveguides in a source switch network as a function of array size ($N_{pix}$), in accordance with one or more embodiments of the present disclosure. In particular, the array size ($N_{pix}$) refers to the number of rows/columns in a square PIC coupler array having $N_{pix}^2$ total pixels. FIG. 11B illustrates routing losses associated with systems configured with Feed 1 only, Feeds 1 and 2, Feeds 1-6, and Feeds 1-8. As can be seen in FIG. 11B, configurations of a source switch network with multiple feedlines may provide efficient routing to large pixel arrays.

Further, in the unlikely event that a certain combination of lines of sight cannot be met due to too many devices in some region of the field of regard, the system can resort to time-based multiplexing. Given the relatively fast switching speeds of the PIC coupler array 100, the throughput reduction associated time-based multiplexing may be minimal.

Additionally, various configurations of feed waveguides and switches in a source switch network may be utilized to provide simultaneous emission of light from multiple pixels (e.g., multiplexed operation).

It is to be understood that a PIC coupler array 100 may have any size or shape. For example, non-square and non-rectangular arrays of couplers 104 may be utilized, for example, to match a desired field of view aspect ratio or to compensate for distortion of an IBBS lens. Further, a source switch network may incorporate any combination of row-wise, mixed row/column and/or skew-wise feeding.

Figure 12A:
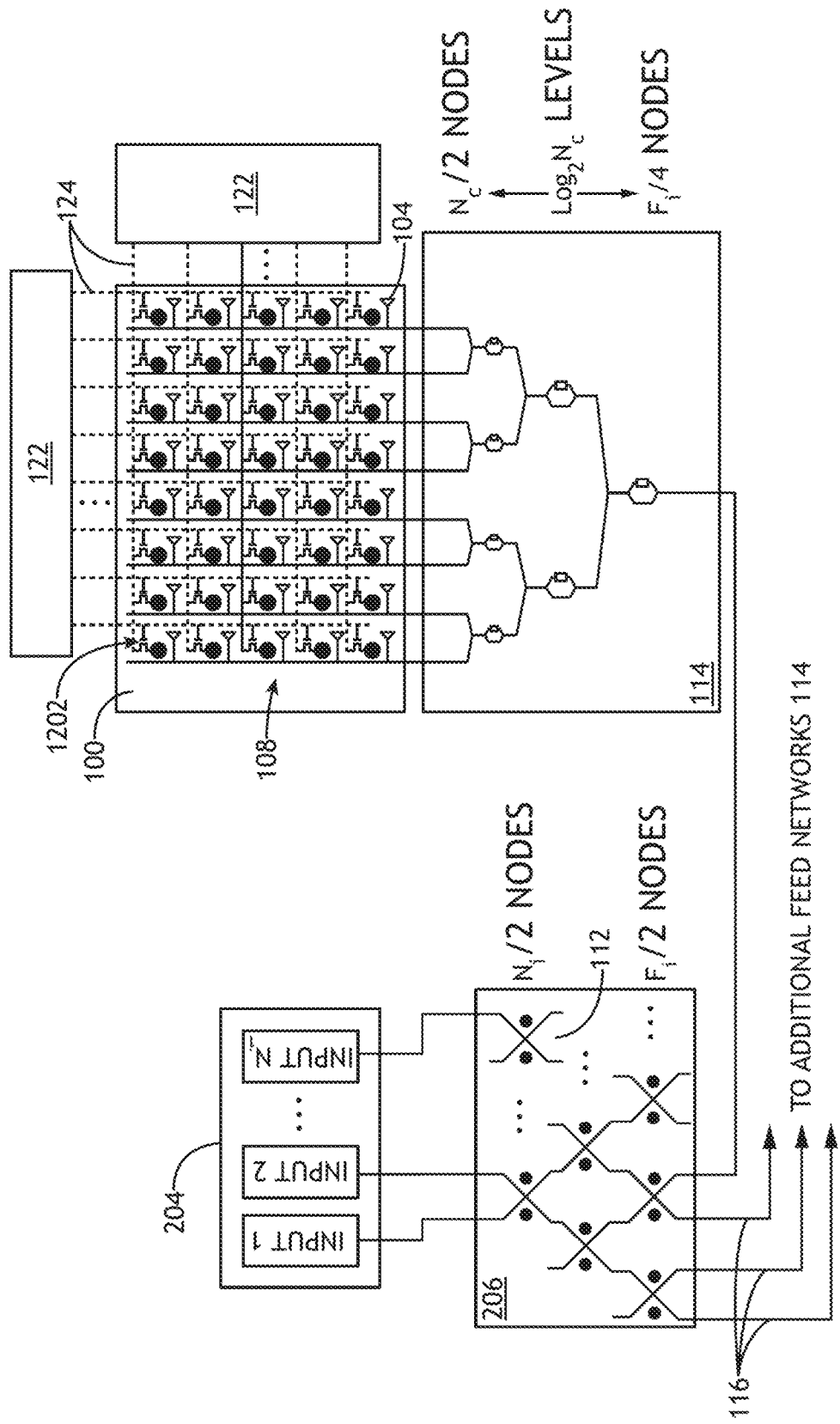
FIG. 12A is a schematic view of a device with cascading switch networks, in accordance with one or more embodiments of the present disclosure.
Figure 12B:
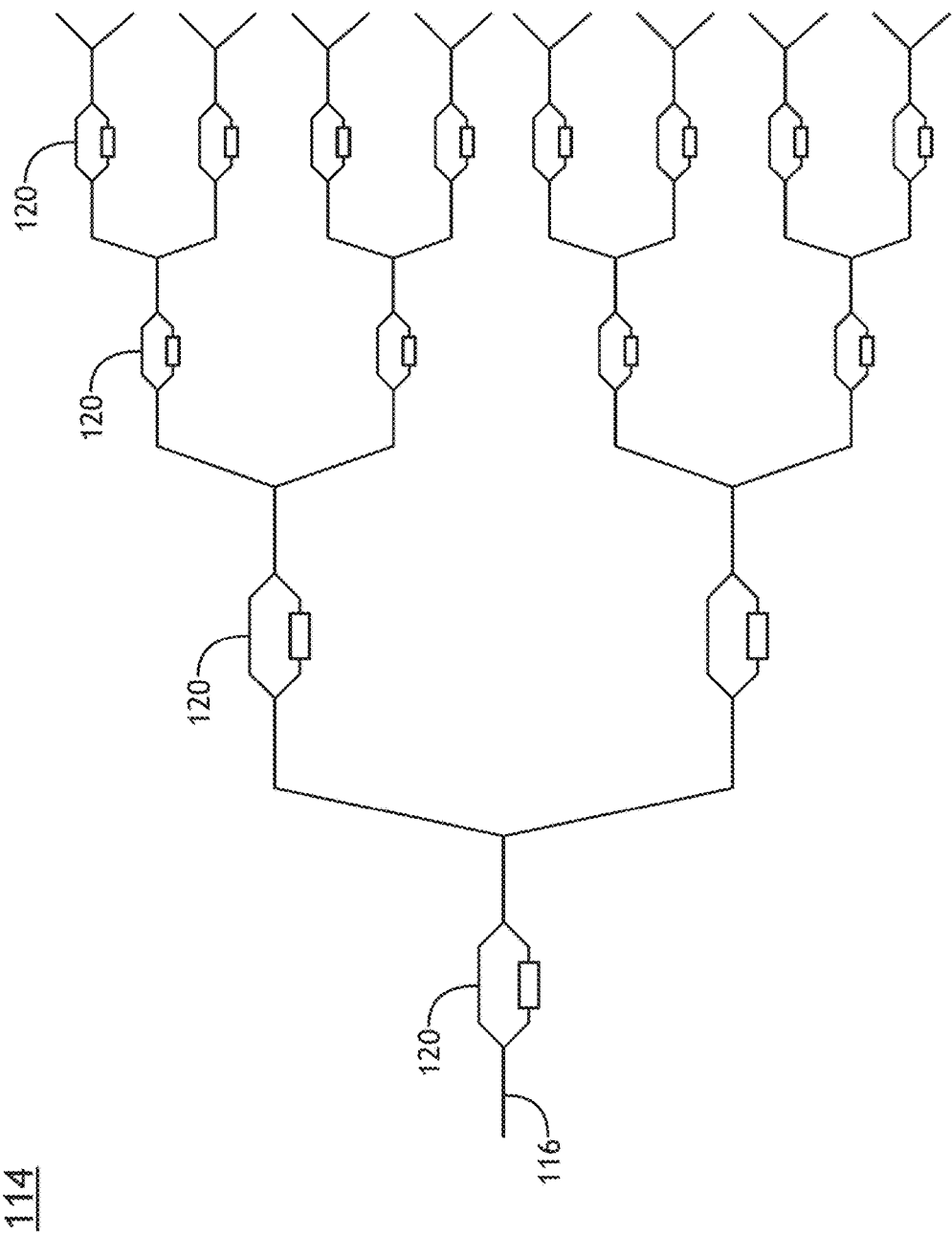
FIG. 12B is a conceptual view of a source switch network including MZI source-control switches, in accordance with one or more embodiments of the present disclosure.

Referring now to FIG. 12A, a schematic view of a device with cascading switch networks is shown, in accordance with one or more embodiments of the present disclosure. In one embodiment, a source switch network 206 includes a column cascade switch network to selectively route input signals into a selected feed network 114, noting that only one feed network 114 is illustrated in FIG. 12A for clarity. In another embodiment, a feed network 114 includes a cascading switch network to selectively route the input signals from a particular feed-line waveguide 116 to a selected pixel-network waveguide 110. In FIG. 12A, "N/2" indicates a number of 2×2 switches in the top row (i.e. entry level) of a cascade network (e.g., the source switch network 206 with N input signals and "F/2" indicates a number of 2×2 switches in the bottom row (i.e. the exit level) designed to route the N signals to F different inputs to the feed networks 114. Further, a number of intermediate levels may be defined in between the two to provide flexible routing. Ideally, any input signal could be routed to any feed-line waveguide 116 without blocking (e.g., allowing other signals to be routed wherever they need to go).

Further, this configuration may reduce the number of switch passes to $\log_2 N$, where N is the number of columns. For example, 128 columns may be addressed with a 7-level cascade. Further, combining multiple feed networks 114 to feed into different heights along the array from above and below (e.g., as illustrated in FIG. 11A) may provide efficient routing.

Further, FIG. 12A illustrates a system with in-pixel transistors 1202 connected to control lines 124 for individual control of each pixel 102, in accordance with one or more embodiments of the present disclosure. In this regard, each pixel rests at ground ("pass" state) unless non-zero row and column biases are applied to convert the pixel to the "drop" state.

As described previously herein, switches in the source switch network may include any type of optical switch known in the art. FIG. 12B is a conceptual view of a source switch network 206 including MZI source-control switches 302, in accordance with one or more embodiments of the present disclosure.

Figure 13:
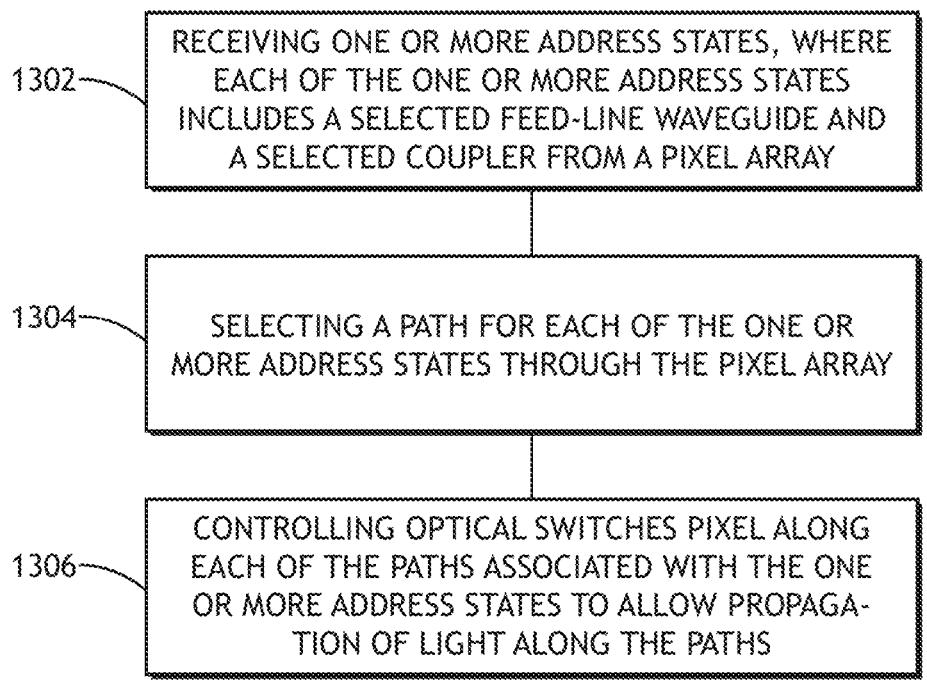
FIG. 13 is a flow diagram illustrating steps performed in a method in accordance with one or more embodiments of the present disclosure.

FIG. 13 is a flow diagram illustrating steps performed in a method 1300 in accordance with one or more embodiments of the present disclosure. Applicant notes that the embodiments and enabling technologies described previously herein in the context of the PIC coupler array 100 should be interpreted to extend to method 1300. It is further noted, however, that the method 1300 is not limited to the architecture of the PIC coupler array 100.

In one embodiment, the method includes a step 1302 of receiving one or more address states, wherein each of the one or more address states includes a selected feed-line waveguide from a feed network and a selected coupler from a pixel array. For example, the pixel array may include, but is not limited to, the PIC coupler array 100 as described herein. In this regard, the pixel array may include a multitude of pixels forming a coupler plane. Further, at least some of the couplers in the pixel array couple light from a direction along the coupler plane to a direction at least partially normal to the coupler plane (e.g., outside of the coupler plane). In this regard the couplers may be configured for any combination of incoupling and outcoupling of light from the coupler plane.

In another embodiment, the method 1300 includes a step 1304 of selecting a path for each of the one or more address states through the pixel array. For example, a path may include a path through selected optical switches (e.g., pixel-network switches 112 or the feed-network switches 120 as described with respect to the PIC coupler array 100 herein) and associated waveguides along the path.

Further, the paths for the one or more address states may be selected using any metric or algorithm. For example, the paths may be selected to mitigate propagation loss, to facilitate multiplex operation (e.g., simultaneous operation of two or more pixels), bi-directional operation, or the like. Further, the paths may be static during run-time or dynamically modified during runtime.

In another embodiment, the method 1300 includes a step 1306 of controlling, with one or more drive signals, the optical switches pixel along each of the paths associated with the one or more address states to allow propagation of light along the paths. The step 1306 may be carried out using any type of drive signal suitable for controlling switches along the paths including, but not limited to, electronic drive signals or optical drive signals.

The control of the drive signals in step 1306 may further be carried out sequentially or simultaneously. Sequential operation may provide operation of a single pixel at a time, whereas simultaneous operation may provide operation of two or more pixels at a time.

In some embodiments, the paths may further include optical switches associated with a transmitter switch network (e.g., source switch network 206) and/or a receiver switch network (e.g., receiver switch network 210), and/or a selection switch network (e.g., selection switch network 214). In this regard, the paths may flow to input sources and/or light detectors that may be on-chip or off-chip.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A coupler array device comprising:
   a coupler array in a coupler plane including a plurality of couplers arranged in two or more rows and two or more columns, wherein each of the plurality of couplers is configured to provide free-space coupling of light between the coupler plane and one or more directions outside of the coupler plane;
   a pixel switch network to selectively couple light into or out of a selected subset of the plurality of couplers from any of two opposite directions in the coupler plane, wherein the pixel switch network comprises:
   two or more pixel-network waveguides disposed along the two or more columns of the coupler array; and
   a plurality of pixel-network switches, wherein each of the plurality of pixel-network switches is configured to selectively couple light between one of the plurality of couplers and one of the two or more pixel-network waveguides; and one or more feed networks, comprising:
two or more feed-line waveguides; and
one or more feed-network switches to selectively couple light between the two or more feed-line waveguides and the plurality of pixel-network waveguides, wherein light is routable between selected couplers of the plurality of couplers and selected feed-line waveguides of the one or more feed networks along selected paths by controlling the pixel-network switches and the feed-network switches along the selected paths, wherein at least two of the two or more feed-line waveguides couple to one or more of the pixel-network waveguides from the opposite directions via the one or more feed networks.

2. The coupler array device of claim 1, wherein at least one of the plurality of pixel-network switches or at least one of the feed-network switches comprises:
at least one of a ring resonator switch, a micro-electromechanical system switch, or a Mach-Zehnder interferometer switch.

3. The coupler array device of claim 1, wherein at least two of the two or more feed-line waveguides couple to a particular one of the two or more pixel-network waveguides at different locations to address different sub-sets of the plurality of couplers along the particular one of the two or more pixel-network waveguides.

4. The coupler array device of claim 1, further comprising:
a source switch network including one or more source switches configured to selectively route light from one or more input light sources to the one or more feed networks.

5. The coupler array device of claim 4, wherein light from one of the one or more input light sources is routable along a selected path to a selected coupler of the plurality of couplers by controlling at least one of the one or more source switches, at least one of the plurality of feed-network switches, and a pixel-network switch corresponding to the selected coupler.

6. The coupler array device of claim 1, further comprising:
a receiver switch network including one or more receiver switches configured to selectively route light from the one or more feed networks to one or more light detectors.

7. The coupler array device of claim 6, wherein light from one of the one or more feed networks is routable along a selected path from a selected coupler of the plurality of couplers to one of the one or more detectors by controlling at least one of the one or more receiver switches, at least one of the plurality of feed-network switches, and a pixel-network switch corresponding to the selected coupler.

8. The coupler array device of claim 6, further comprising:
one or more demultiplexer banks configured to separate the light from the selected coupler along two or more spectral channels.

9. An imaging-based beam steering system comprising:
one or more input light sources;
a photonic integrated circuit (PIC) coupler array comprising:
a coupler array in a coupler plane including a plurality of couplers arranged in two or more rows and two or more columns, wherein each of the plurality of couplers is configured to provide free-space coupling of light between the coupler plane and one or more directions outside of the coupler plane;
a pixel switch network to selectively couple light into or out of a selected subset of the plurality of couplers from any of two opposite directions in the coupler plane, wherein the pixel switch network comprises:
two or more pixel-network waveguides disposed along the two or more columns of the coupler array; and
a plurality of pixel-network switches, wherein each of the plurality of pixel-network switches is configured to selectively couple light between one of the plurality of couplers and one of the two or more pixel-network waveguides;
one or more feed networks, comprising:
two or more feed-line waveguides; and
one or more feed-network switches to selectively couple light between the two or more feed-line waveguides and the plurality of pixel-network waveguides, wherein light is routable between selected couplers of the plurality of couplers and selected feed-line waveguides of the one or more feed networks along selected paths by controlling the pixel-network switches and the feed-network switches along the selected paths, wherein at least two of the two or more feed-line waveguides couple to one or more of the pixel-network waveguides from the opposite directions via the one or more feed networks.

10. The imaging-based beam steering system of claim 9, wherein the controller is configured to simultaneously control the pixel-network switches, the feed-network switches, and the source switches along the path for each of the one or more address states to simultaneously emit light from two or more couplers of the PIC coupler array.

11. The imaging-based beam steering system of claim 9, wherein the controller is configured to sequentially control the pixel-network switches, the feed-network switches, and the source switches along the path for each of the one or more address states to sequentially emit light from two or more couplers of the PIC coupler array.

12. The imaging-based beam steering system of claim 9, further comprising:
a translation stage communicatively coupled to the controller to translate the PIC coupler array with respect to the lens within the coupler plane, wherein the controller is further configured to selectively translate the PIC coupler array with respect to the lens within the coupler plane to tune the selected output angles.

13. The imaging-based beam steering system of claim 12, wherein the lens is mounted to the translation stage.

14. The imaging-based beam steering system of claim 12, wherein the PIC coupler array is mounted to the translation stage.

15. The imaging-based beam steering system of claim 9, further comprising:
an adjustable mirror positioned between the PIC coupler array and the lens, wherein the controller is further configured to selectively rotate the adjustable mirror to tune the selected output angles.

16. The imaging-based beam steering system of claim 9, further comprising:
an adjustable mirror positioned after the lens, wherein the controller is further configured to selectively rotate the adjustable mirror to tune the selected output angles.

17. The imaging-based beam steering system of claim 9, further comprising:
an adjustable phase modifier to provide at least one of an adjustable deviation of the selected output angles or a displacement of the light along the selected output angles, wherein the controller is further configured to selectively control the adjustable phase modifier.

18. The imaging-based beam steering system of claim 17, wherein the adjustable phase modifier comprises:
a spatial light modulator.

19. The imaging-based beam steering system of claim 9, further comprising:
a translation stage communicatively coupled to the controller to translate the PIC coupler array with respect to the lens along an optical axis of the lens the coupler plane, wherein the controller is further configured to selectively translate the PIC coupler array with respect to the lens to adjust a divergence of the light emerging from the lens.

20. The imaging-based beam steering system of claim 19, wherein the translation stage is mounted to one of the lens or the PIC coupler array.

21. The imaging-based beam steering system of claim 9, wherein the controller is further configured to select the path for each of the one or more address states to mitigate routing loss.

22. The imaging-based beam steering system of claim 9, wherein the controller comprises:
at least one of a field-programmable gate array, a microprocessor, or central processing unit.

23. The imaging-based beam steering system of claim 9, wherein at least one of the plurality of pixel-network switches or at least one of the feed-network switches comprises:
at least one of a ring resonator switch, a micro-electromechanical system switch, or a Mach-Zehnder interferometer switch.

24. An imaging-based beam receiving system comprising:
a photonic integrated circuit (PIC) coupler array comprising:
a coupler array in a coupler plane including a plurality of couplers arranged in two or more rows and two or more columns, wherein each of the plurality of couplers is configured to provide free-space coupling of light between the coupler plane and one or more directions outside of the coupler plane;
a pixel switch network to selectively couple light into or out of a selected subset of the plurality of couplers from any of two opposite directions in the coupler plane, wherein the pixel switch network comprises:
two or more pixel-network waveguides disposed along the two or more columns of the coupler array; and
a plurality of pixel-network switches, wherein each of the plurality of pixel-network switches is configured to selectively couple light between one of the plurality of couplers and one of the two or more pixel-network waveguides; and
one or more feed networks, comprising:
two or more feed-line waveguides; and
one or more feed-network switches to selectively couple light between the two or more feed-line waveguides and the plurality of pixel-network waveguides, wherein light is routable between selected couplers of the plurality of couplers and selected feed-line waveguides of the one or more feed networks along selected paths by controlling the pixel-network switches and the feed-network switches along the selected paths, wherein at least two of the two or more feed-line waveguides couple to one or more of the pixel-network waveguides from the opposite directions via the one or more feed networks;
a lens positioned with the PIC coupler array at a focal plane, wherein the lens is configured to direct light to the light from the PIC coupler array, wherein the lens maps light from selected input angles incident on the lens to selected locations of the PIC coupler array;
one or more light detectors;
a receiver switch network including one or more receiver switches configured to selectively route light from the one or more feed networks to one or more light detectors; and
a controller coupled to the pixel-switch network and the receiver switch network, wherein the controller is configured to:
receive one or more address states, wherein each of the one or more address states includes a selected light detector from the one or more light detectors and a selected coupler from the plurality of couplers;
select a path for each of the one or more address states; and
control, with one or more drive signals, the pixel-network switches, the feed-network switches, and the receiver switches along the paths for each of the one or more address states to direct light along the paths for each of the one or more address states for detection by the one or more light detectors.

25. The imaging-based beam receiving system of claim 24, wherein the controller is configured to simultaneously control the pixel-network switches, the feed-network switches, and the source switches along the path for each of the one or more address states to simultaneously collect light from two or more couplers of the PIC coupler array.

26. The imaging-based beam receiving system of claim 24, wherein the controller is configured to sequentially control the pixel-network switches, the feed-network switches, and the source switches along the path for each of the one or more address states to sequentially collect light from two or more couplers of the PIC coupler array.

27. The imaging-based beam receiving system of claim 24, further comprising:
a translation stage communicatively coupled to the controller to translate the PIC coupler array with respect to the lens within the coupler plane, wherein the controller is further configured to selectively translate the PIC coupler array with respect to the lens within the coupler plane to tune the selected input angles.

28. The imaging-based beam receiving system of claim 24, further comprising:
an adjustable mirror positioned between the PIC coupler array and the lens, wherein the controller is further configured to selectively rotate the adjustable mirror to tune the selected input angles.

29. The imaging-based beam receiving system of claim 24, further comprising:
an adjustable mirror positioned after the lens, wherein the controller is further configured to selectively rotate the adjustable mirror to tune the selected input angles.

30. The imaging-based beam receiving system of claim 24, further comprising:
an adjustable phase modifier to provide an adjustable deviation of at least one of the selected input angles or an optical path of the light along the selected input angles, wherein the controller is further configured to selectively control the adjustable phase modifier.

31. The imaging-based beam receiving system of claim 30, wherein the adjustable phase modifier comprises:
a spatial light modulator.

32. The imaging-based beam receiving system of claim 24, further comprising:
a translation stage communicatively coupled to the controller to translate the PIC coupler array with respect to the lens along an optical axis of the lens the coupler plane, wherein the controller is further configured to selectively translate the PIC coupler array with respect to the lens to adjust a divergence of the light emerging from the lens.

33. The imaging-based beam receiving system of claim 24, wherein the controller is further configured to select the path for each of the one or more address states to mitigate routing loss.

34. The imaging-based beam receiving system of claim 24, wherein the controller comprises:
at least one of a field-programmable gate array, a microprocessor, or central processing unit.

35. The imaging-based beam receiving system of claim 24, wherein at least one of the plurality of pixel-network switches or at least one of the feed-network switches comprises:
at least one of a ring resonator switch, a micro-electromechanical system switch, or a Mach-Zehnder interferometer switch.

36. The coupler array device of claim 1, wherein the at least two of the two or more feed-line waveguides provide simultaneous light routing to or from multiple couplers in a common one of the two or more pixel-network waveguides along the opposite directions.

37. The coupler array device of claim 3, wherein the at least two of the two or more feed-line waveguides coupled to the particular one of the two or more pixel-network waveguides limit routing losses associated with the plurality of couplers along the particular one of the two or more pixel-network waveguides.

38. The coupler array device of claim 1, wherein at least one of the plurality of couplers comprises:
a pair of directional couplers including a first directional coupler and a second directional coupler, wherein the pair of directional couplers is coupled to one of the two or more pixel network waveguides, wherein the first directional coupler couples light from a first direction and the second directional coupler couples light from a second direction opposite the first direction.

* * * * *